United States Patent
Sheffer et al.

[11] Patent Number: 5,844,522
[45] Date of Patent: Dec. 1, 1998

[54] MOBILE TELEPHONE LOCATION SYSTEM AND METHOD

[75] Inventors: Eliezer A. Sheffer, San Diego; Paul J. Bouchard, Valley Center, both of Calif.

[73] Assignee: Trackmobile, Inc., San Diego, Calif.

[21] Appl. No.: 543,031

[22] Filed: Oct. 13, 1995

[51] Int. Cl.[6] ....................................................... G01S 3/02
[52] U.S. Cl. ......................... 342/457; 455/32.1; 455/33.1
[58] Field of Search .......................... 342/457; 455/32.1, 455/33.1, 54.1, 56.1

[56] References Cited

U.S. PATENT DOCUMENTS

| | | | |
|---|---|---|---|
| 4,177,466 | 12/1979 | Reagan | 343/112 TC |
| 4,704,734 | 11/1987 | Menich et al. | |
| 4,726,050 | 2/1988 | Menich et al. | |
| 4,728,959 | 3/1988 | Maloney et al. | 342/457 |
| 4,730,187 | 3/1988 | Menich et al. | |
| 4,742,357 | 5/1988 | Rackley | 342/457 |
| 4,891,650 | 1/1990 | Sheffer | 342/457 |
| 5,055,851 | 10/1991 | Sheffer | 342/457 |
| 5,203,009 | 4/1993 | Bogusz et al. | 455/33.1 |
| 5,218,367 | 6/1993 | Sheffer et al. | 342/457 |
| 5,293,642 | 3/1994 | Lo | 455/33.1 |
| 5,293,645 | 3/1994 | Sood | 455/54.1 |
| 5,317,323 | 5/1994 | Kennedy et al. | 342/457 |
| 5,327,144 | 7/1994 | Stilp et al. | 342/387 |
| 5,394,158 | 2/1995 | Chia | 342/457 |
| 5,434,904 | 7/1995 | Tsuzuki et al. | 379/58 |
| 5,515,419 | 5/1996 | Sheffer | 379/58 |
| 5,602,903 | 2/1997 | LeBlanc et al. | 379/60 |

FOREIGN PATENT DOCUMENTS 0417944  3/1991  European Pat. Off. .

*Primary Examiner*—Theodore M. Blum
*Attorney, Agent, or Firm*—Brown, Martin, Haller & McClain, LLP

[57] ABSTRACT

A wireless network based location system and method uses an existing wireless communication network to locate the position of any active phone or transceiver unit in the network. The system includes a plurality of agile vector sensor units, one each installed at each antenna site in the network, and a remote central monitoring station to which wireless network users can call for assistance in the event of an emergency. The system is designed to locate a portable phone transceiver unit using the reverse voice channel signal transmitted by the transceiver unit. Each agile vector sensor unit locks onto the reverse voice channel to determine azimuth and signal strength in the reverse voice channel, and also tracks any changes in voice channel by monitoring the forward voice channel. In the event of a voice channel change, the sensor unit tunes to the new voice channel. The azimuth, signal strength, and reverse voice channel information collected is used to track the location of a transceiver unit in real time.

25 Claims, 13 Drawing Sheets

Fig. 13 CHANNEL NUMBER

| CELL SITE # | VOICE CH. #1 | | VOICE CH. #2.. | | CONTROL CH. 313-354.. | | VOICE CH. #1023 | |
|---|---|---|---|---|---|---|---|---|
| | RSSI | AZIMUTH | RSSI | AZIMUTH | RSSI | AZIMUTH | RSSI | AZIMUTH |
| 1 | | | 100 | 45 | | | | |
| 23 | | | 100 | 135 | | | | |
| 150 | | | 100 | 225 | | | | |
| N | | | 100 | 315 | | | | |

Fig. 14 CHANNEL NUMBER

| CELL SITE # | VOICE CH. #1 | | VOICE CH. #2.. | | CONTROL CH. 313-354.. | | VOICE CH. #1023 | |
|---|---|---|---|---|---|---|---|---|
| | RSSI | AZIMUTH | RSSI | AZIMUTH | RSSI | AZIMUTH | RSSI | AZIMUTH |
| 1 | | | | | | | 100 | 45 |
| 23 | | | | | | | 100 | 135 |
| 150 | | | | | | | 100 | 225 |
| N | | | | | | | 100 | 315 |

Fig. 15

CHANNEL NUMBER

| CELL SITE # | VOICE CH. #1 | | VOICE CH. #2 | | CONTROL CH. 313-354.. | | VOICE CH. #1023 | |
|---|---|---|---|---|---|---|---|---|
| | RSSI | AZIMUTH | RSSI | AZIMUTH | RSSI | AZIMUTH | RSSI | AZIMUTH |
| 1 | | | 30 | 60 | | | | |
| | | | | | | | | |
| 23 | | | 30 | 120 | | | | |
| | | | | | | | | |
| 150 | | | 50 | 135 | | | | |
| | | | | | | | | |
| N | | | 50 | 45 | | | | |

Fig. 16

CHANNEL NUMBER

| CELL SITE # | VOICE CH. #1 | | VOICE CH. #2 | | CONTROL CH. 313-354.. | | VOICE CH. #1023 | |
|---|---|---|---|---|---|---|---|---|
| | RSSI | AZIMUTH | RSSI | AZIMUTH | RSSI | AZIMUTH | RSSI | AZIMUTH |
| 1 | 20 | 70 | | | | | | |
| | | | | | | | | |
| 23 | 20 | 110 | | | | | | |
| | | | | | | | | |
| 150 | 30 | 270 | | | | | | |
| | 40 | 270 | | | | | | |
| N | 30 | 60 | | | | | | |

MOBILE TELEPHONE LOCATION SYSTEM AND METHOD

BACKGROUND OF THE INVENTION

The present invention relates generally to a location system and method for locating the position of a mobile telephone, and is particularly concerned with a system using an existing wireless telephone or communications network, such as cellular, PCS, or other types of wireless communication networks, in locating a target telephone within the network in the event of an emergency situation, or for other reasons.

Numerous location systems have been proposed in the past for locating the position of a target emitting a radio or cellular signal. All previous systems have been subject to various disadvantages. Some proposed methods are satellite-based, for example using the Global Positioning System, or GPS, with receivers receiving signals from orbiting satellites in order to determine approximate location. However, such a system has limited operation in heavily built urban areas and cannot readily provide voice or data communications. Such systems also require specialized end-user equipment. Additionally, these systems can locate a target to an approximate area of 100 yards. In practice, this may not be sufficient to pinpoint a phone which may be within a building, for example.

Other systems involve use specialized radio positioning methods. However, this also requires installation of heavy infrastructure, and requires specialized end-user telephone equipment. A number of location systems have also been proposed which use existing cellular telephone network infrastructure. For example, U.S. Pat. Nos. 5,218,367, 5,055,851 and 4,891,650 of Sheffer all describe locating systems which utilize cellular technology. In U.S. Pat. No. 5,218,367, the cellular telephone itself is modified to receive signal strength and cell identifying information from all adjacent cell sites, and to transmit this information to a monitoring station which includes a computer programmed to calculate an approximate vehicle location. One disadvantage of this system is that it can only be used to locate specialized, or modified, cellular telephones and cannot locate conventional, unmodified phones.

In U.S. Pat. No. 4,728,959 of Maloney et al. a location system is described in which detector units are used to detect reverse control channel signals emitted from mobile phones, and determine azimuth angles for the phone to determine the direction from which the signals are emitted. Phase angle measurements of the direction of the phone from a plurality of land stations are processed to produce a probability density function, producing an x-y coordinate area representing the most likely location of the phone.

This system is subject to a number of disadvantages, along with the other known system which locate only a rough, x-y coordinate position. An x-y coordinate position is unlikely to be sufficient to pinpoint the location of the mobile phone with sufficient accuracy, particularly in a heavily built-up, urban area including multi-story buildings and underground parking lots. Even if the correct building can be located, which is not certain given the accuracy of these systems, the location of the individual calling for help within the building will be completely unknown, and a significant amount of extra time will be necessary in searching the building from floor to floor. In an emergency situation, the caller must be found as quickly as possible, and this is not feasible with systems of the type described by Maloney.

Another disadvantage of Maloney is the use of a reverse control channel signal to locate a mobile phone. Each cell site in a cellular system has a fixed control channel frequency over which forward control channel signals are transmitted to mobile phones in the vicinity. All mobile phones assigned to that cell site will use the same frequency to transmit reverse control channel, or RCC, signals back to the cell site. The identification code or NAM for each phone will be embedded in the emitted RCC signal packet. RCC signals are not emitted continuously, but only in an irregular fashion depending on reorder conditions, such as hand-off. For each mobile phone, the RCC signal is emitted in short bursts at irregular time intervals. Thus, there may be relatively long periods of time when no RCC signal is emitted. Another problem is that up to 60 phones may be assigned to the same cell site at any time, and the only way they can be distinguished from one another using the RCC signal is by deciphering each RCC received to determine the NAM of the desired target, which may or may not be emitting an RCC signal at the time. Thus, this location system is relatively unreliable and does not allow a target phone location to be pinpointed with sufficient accuracy to enable emergency assistance to be deployed quickly to the target.

SUMMARY OF THE INVENTION

It is an object of this invention to provide a new and improved location system and method using cellular or other wireless telephone technology.

According to one aspect of the present invention, a portable phone tracking system is provided, which utilizes parts of an existing wireless telephone communication system such as a cellular phone network. Each cellular phone network includes a plurality of cell or antenna sites for receiving and transmitting wireless voice and control channel signals when linked with a wireless or cellular phone in the vicinity of the antenna site, and for linking the cellular phone to another phone via a mobile telephone switching office, or MTSO, and the public telephone network. Each antenna or cell site covers a predetermined area and will be the active cell site for any portable phones making or receiving calls within that area. Special hand-off procedures are used for transferring calls from an active cell site to a neighboring cell site when the phone moves from one cell area to another. The cellular phone system will operate in a certain frequency range divided into separate channels, some of which will be assigned as voice or communication channels for forward and reverse communication and others of which are assigned as control and/or signaling channels for sending forward and reverse control signals. Each caller in the network will be assigned an initial communication channel, for voice or other types of communications, via the forward control channel (FCC) of the active cell site. The initially assigned reverse voice channel may be changed quite rapidly and several times during a call. The tracking system of this invention is designed to track the initial reverse voice channel and all reassigned reverse voice channels for a particular call on a real-time basis during the entire call duration, and to use the determined voice channels as a beacon to direction finding equipment in order to locate the exact position of the cellular phone.

According to the present invention, a wireless phone location system is provided, which includes a plurality of agile vector sensor units, each agile vector sensor unit being mounted at a respective cell site in a cellular telephone network such that an agile vector sensor unit is located at every cell site in the network, and each agile vector sensor unit comprising a scanning assembly for scanning over the frequency range of the telephone network and detecting any calls within the range of the scanning assembly, a direction finder assembly for determining azimuth and signal strength of the particular voice channel, a receiver assembly for receiving control and voice channel signals of the cell site and the target phone and determining the identification code of all phones in the area connected to that cell site, and the initially assigned voice channel for each connected phone, an information storage system for storing the identification code and initial voice channel of connected calls, and the azimuth and signal strength for each detected voice channel signal, and a receiver assembly for detecting and storing new voice channel assignments, and tuning the direction finder assembly automatically and rapidly to the new voice channels to determine azimuth and signal strength in each new voice channel on a real-time basis. The system also includes a monitoring system at a remote facility for determining the currently active cell site for a selected phone in the network and the initially assigned voice channel for that phone, determining neighboring cell sites to the currently active cell, and sending control signals to the sensor units at the active and neighboring cell sites to begin transmitting collected information for at least a selected phone to the monitoring station, and an analyzer for determining a probable location area for the selected phone from the information received from the sensor units.

The monitoring system may command the sensor units to transmit all stored information for all calls in the vicinity, and may be programmed to filter or extract information for the selected phone from the incoming data. Preferably, all sensor units continuously scan and collect information on at least the voice channel assignments, and write over the previously collected information unless activated by a control signal from the monitoring system. When activated, sensor units periodically transmit collected information to the monitoring system.

Preferably, a plurality of field response units or vehicles are provided, each having an extra, stand alone field direction finder unit including a receiver for linking the unit to the monitoring system at the remote site, and an automatic tuner for automatically tuning the unit to a selected voice channel received from the monitoring system. When the monitoring system determines an approximate location for a selected phone, one or more field response units are dispatched to the area, with the direction finder unit in each vehicle linked to the monitoring system. The monitoring system will transmit all voice channel changes in real time for that caller to the field direction finder units to tune them automatically to the current voice channel for the selected call, so that they can hone in on the selected call and locate the precise position of the portable phone. Thus, unlike previous phone location systems which locate call position to an accuracy of 100 yards or so only, and provide only a two-dimensional or x-y position for the target, this system enables a direction finder to lock on to the uniquely assigned reverse voice channel of a calling phone, and to track and lock onto changed voice channels on a real-time basis, so that the caller can be located with pinpoint accuracy in x, y and z coordinates. This is extremely important in an emergency medical or crime situation, for example, where an accuracy of 100 yards will not necessarily enable the caller to be found quickly. Also, if the caller is in an underground or above ground parking lot or in a multi-story building, the radio direction finder unit will still be able to pinpoint z coordinate position within the building.

Previous location systems, such as Maloney, compute x-y coordinate location only, and use signals which are not on at all times. Since these signals are not on at all times, they cannot be used as a beacon for direction finding equipment. The system of this invention, in contrast, uses the reverse voice channel signal, which is always on, as a tracking beacon for a field direction finder unit to track the x, y and z coordinate position quickly and accurately.

The remote monitoring station will be able to determine the currently assigned voice channel for a selected call, and will control sensor units at neighboring cell site to scan this voice channel and collect azimuth and signal strength information for the current voice channel, and to transmit that information to the monitoring station. This information can then be used in the location determination. The system preferably includes at least one local computer which is connected to each MTSO in the network, and which is programmed to trap all calls to the monitoring center, including the active cell identification, sector number and initial voice channel assignment from the cellular carrier MTSO (mobile telephone switching office) which is currently handling the selected phone, and to transmit that information to the central monitoring station. The local computer may be physically located at one of the MTSO sites in the system and include a modem for communicating with all the other MTSO sites, or it may be located at the central monitoring station and linked to all MTSO sites via modem. The system includes a cell site data base of the geographical location of each cell site, and a neighboring cell site data base of the nearest neighbors of each cell site. These data bases may be located at the local computer or at the central monitoring station.

Preferably, the central monitoring station includes a plurality of work stations each including a first, phone location computer for determining an approximate phone location and a second, map computer for displaying a map including the calculated position. Portable phones in the cellular network may make emergency calls to the central monitoring station, and all such calls are assigned to a particular workstation based on current work load. Receipt of an emergency call will initiate a phone location procedure, in which the identification code for that phone is determined, the network is searched for that identification code and the currently active cell site for that phone, and the sensor units at the active cell site and neighboring sites are activated to begin transmitting data on at least that call to the monitoring station.

According to another aspect of the present invention, a method of locating a portable phone is provided, which comprises the steps of:

providing an agile vector sensor unit at each cell site in a cellular network;

determining the active cell site and neighboring cell sites for a selected phone which is currently in use;

activating the sensor unit at the active cell site to scan the forward voice channel of the active cell site to detect any voice channel assignment changes for connected calls;

determining the new voice channel of any connected call;

tuning the sensor unit to all currently assigned reverse voice channels in turn and determining the azimuth and signal strength for each reverse voice channel signal;

transmitting new voice channel assignments, azimuth and signal strength information to a central monitoring station;

at the central monitoring station, determining the currently assigned voice channel for a selected phone and controlling sensor units at neighboring cell sites to scan that voice channel and collect and transmit azimuth and signal strength information to the central monitoring station; and determining an approximate phone location from the azimuth and signal strength information received from the active and neighboring cell sensor units.

During the location process, the central monitoring station will receive information on new voice channel assignments on an ongoing basis, so that the voice channel for the selected phone can be updated as necessary, and the correct voice channel information can be used to re-tune the sensor units as necessary. Field response units can then be dispatched, with their own direction finder units being automatically tuned and re-tuned with each change in voice channel.

This system and method uses the reverse voice channel of a portable phone as a signal to lock onto. The reverse voice channel is the only uniquely identifiable signal emitted by a portable phone which is emitted, or "on," continuously over the entire duration of a call. Thus, it is the best signal to use for locking onto, and tracking, a portable phone. However, the reverse voice channel assignment may be changed several times during a call, and this system enables such changes to be detected quickly, so that the system can tune to a newly assigned voice channel on an ongoing basis, and receive and analyze azimuth and signal strength information for the current voice channel at all times and in real time.

The system of this invention does not require any modification whatsoever to the hardware or software of any portable phone, cell site, or MTSO of an existing cellular system. It simply adds on to an existing system or network, in the form of an agile vector sensor unit mounted at each cell site but not connected, in any way, to the cell site electronics/network, a separate central monitoring station for controlling the sensor units and receiving data from the sensor units, and one or more local computers for connection to each MTSO either locally or remotely, as well as automatically tunable direction finder units in each of a plurality of field response units for pinpointing a call location once an approximate location has been determined. Only one central monitoring station is needed for locating any mobile phone, nationwide or even worldwide.

This system is intended to be used primarily for locating a portable phone in the event of an emergency. However, it may also be used to detect cellular phone clones, since it can locate any currently active phone by identification number or NAM, and can detect if more than one phone having the same NAM is in use simultaneously, or if a NAM is being used in the wrong city for a particular subscriber. The central monitoring station may broadcast to all agile vector sensor units, nationwide, to determine the location of any phone having a selected NAM, for anti-fraud purposes. The system may also be used for network management purposes.

The system of this invention enables a portable phone making a call to be located much more accurately and exactly than was previously possible, so that field response units can hone in on the originating voice channel signals with great precision. This can enable a caller in an emergency situation to be located much faster than was previously possible, which can be critical.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 6 is a graphical illustration of information collected at an agile vector sensor unit;

FIGS. 13–16 are graphical illustrations of successive steps in one specific example of a location procedure.

DESCRIPTION OF THE PREFERRED EMBODIMENT

Figure 1:
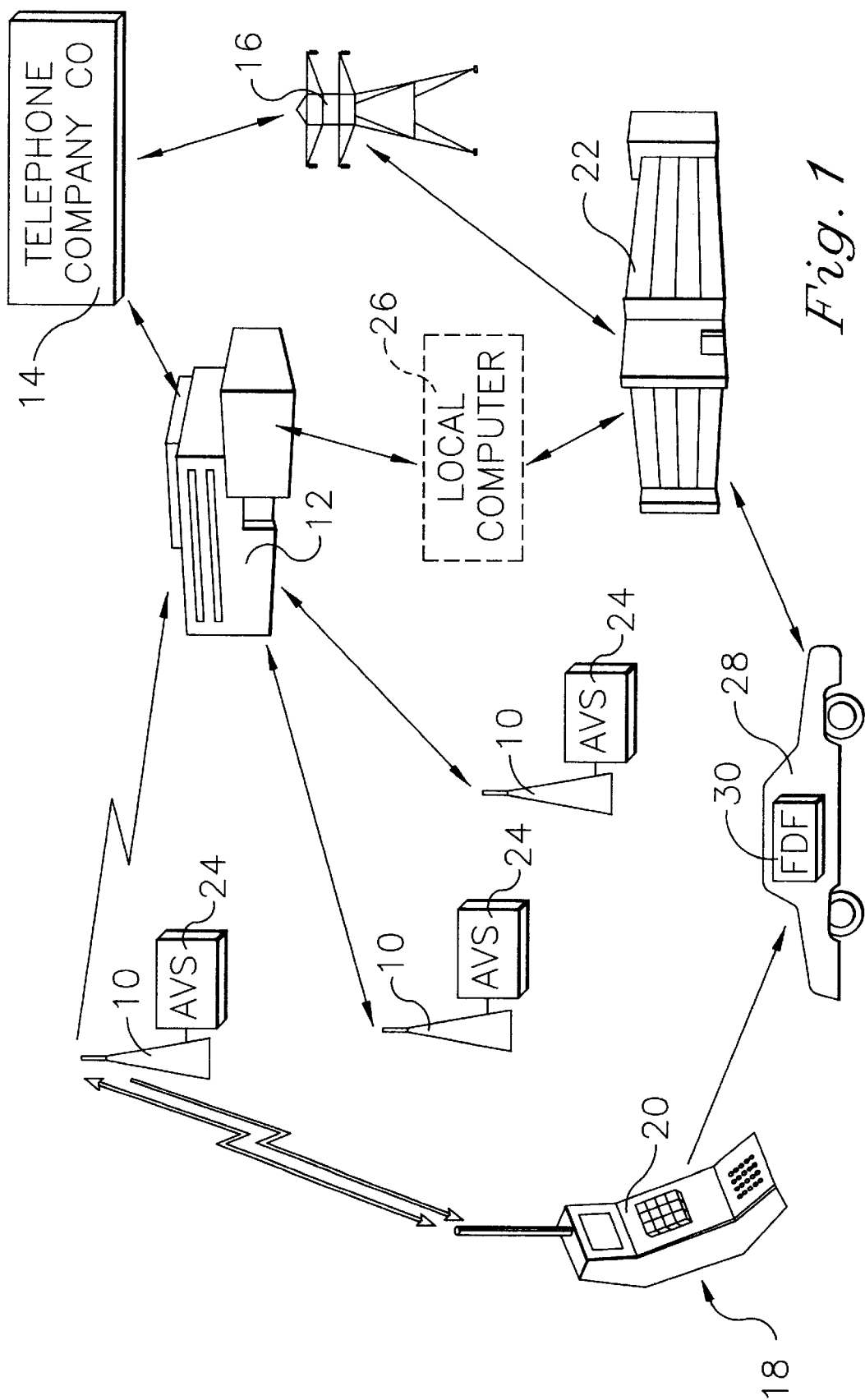
FIG. 1 is a schematic block diagram of a cellular phone system incorporating a location system according to a preferred embodiment of the present invention.

FIG. 1 of the drawings illustrates a wireless or cellular communication system incorporating the location system according to a preferred embodiment of the present invention, and FIGS. 2–16 illustrate various components of the location system and steps in the location method of the preferred embodiment.

As illustrated in FIG. 1, a cellular communication system includes a plurality of radio transmitters or cell sites 10 each covering a predetermined area. All cell sites 10 in a particular region will be linked via an MTSO or mobile telephone switching office 12 to a telephone company central office 14. There will be a number of MTSO's each linked to cell sites in a different region, over the entire area covered by the communication system, according to standard cellular technology. Calls transmitted to the central office 14 are relayed to the appropriate telephone numbers via telephone lines or microwave link 16, also in a conventional manner. A conventional cellular or portable phone unit 18 may therefore be used to make calls within the area covered by the cellular phone system.

When the user wishes to make a cellular or wireless call, they simply punch in the appropriate phone number on the key pad 20 of the cellular phone. Such calls are transmitted via the closest adjacent cell site 10 to the MTSO for that cell site, and are conveyed from there via the central office 14 to the selected phone subscriber. Calls are conveyed back to the cellular phone in a similar manner. The location system and method of this invention can locate the approximate position of any conventional, AMPS analog cellular phone, irrespective of brand name, without requiring any modification of the phone unit itself. Although the preferred embodiment of the invention is described in conjunction with an existing cellular phone network, it will be understood that the location system and method may alternatively be used with other wireless communication systems which may be available in the future, such as the so-called PCS or personal communication system or satellite-based communication systems using communications technology other than cellular.

In order to better understand the phone location system and method of this invention, operation of a conventional cellular phone system or network will first be briefly described. Each cellular phone system operates over an assigned frequency range which is divided into a number of separate channels, typically channels 1 to 1023, each channel corresponding to a certain frequency. A large number of these channels will be voice or communication channels for subscribers communication signals, while certain channels will be control channels for sending control signals to and from cellular phones. Each cell site will have a specific forward control channel or FCC assigned to it. When a phone call is activated at a cell site, the cellular network assigns an initial voice channel for that phone. The initial voice channel assignment is transmitted to the calling phone via the FCC or forward control channel. Voice signals are then transmitted from the phone over the assigned reverse voice channel (RVC). During the call, the initial RVC may be changed by the cellular system for various reasons but particularly during hand-offs, and such changes may occur at a very rapid rate. If the portable phone is moving, change in voice channel assignment can occur as a result of movement from the area of one cell site to another (inter-cell). Even if the portable phone remains in the same area, changes in voice channel assignment can also occur as a result of signal variation or proximity to cell boundaries, for example (intra-cell). After the initial voice channel assignment, changes in voice channel assignment are transmitted to the cellular phone via the forward voice channel or FVC.

In a preferred embodiment of the invention, as schematically illustrated in FIG. 1, a central monitoring station or communication and dispatch center (CDC) 22 is provided and is assigned one or more 800 or toll free numbers in the cellular network. Additionally, an agile vector sensor or AVS unit 24 is mounted at each cell site 10 in the network. Unit 24 will be enclosed in a suitable housing and will be relatively compact. It can be readily mounted on the roof at a cell site, and is not directly connected or integrated with the cell site in any way, other than power and telephone connections.

One or more local computers 26 are also provided in the system for communicating with all MTSO's 12 in the system and with the CDC 22. The local computer 26 is illustrated in dotted outline in FIG. 1 since the exact physical location of this computer is not critical. It may be co-resident with one MTSO 12 and linked to all other MTSO's and the CDC via modems, or it may be co-resident with the CDC and linked to all the MTSO's via modems. One local computer 26 may be sufficient, depending on the size of the cellular network, and more than one local computer 26 will be provided for large metropolitan areas.

The system also includes follow-up or field response vehicles 28 for receiving location information from the CDC 22 and driving to the location. Each vehicle 28 will have a stand-alone, field direction finder unit 30 for tracking signals emitted by the cellular phone unit 18. In the event of a medical or other emergency, a subscriber having a cellular unit 18 can simply dial the number of the central monitoring station in order to initiate a location sequence.

Figure 2:
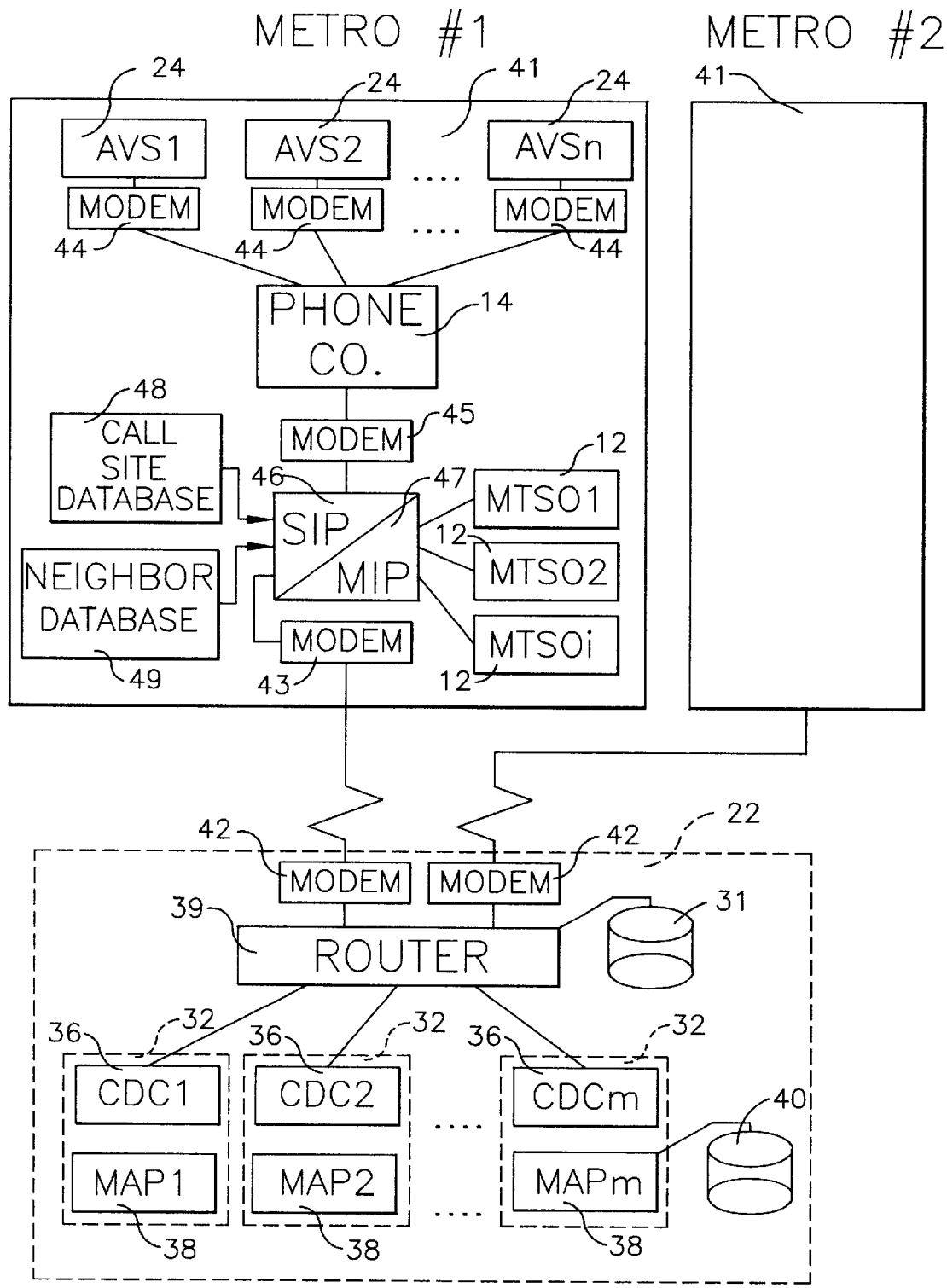
FIG. 2 is more detailed block diagram of the location system.

The location system is illustrated in more detail in FIG. 2. As illustrated in FIG. 2, the call communication and dispatch center or CDC 22 includes a plurality of CDC workstations 32. One CDC or monitoring station 22 may be linked via modems 42 to cellular phone systems in one or more metropolitan areas 41, as indicated in FIG. 2. Thus, a single CDC 22 may be used for monitoring and locating phones nationwide or even worldwide. Each metropolitan area will include a number of MTSOs 12, all of which will be linked to a local computer 26. The local computer is preferably divided into two parts or linked microprocessors, the site interface processor or SIP 46 and the MTSO interface processor or MIP 47. MIP 47 communicates with each MTSO 12 in the city or other area 41, while SIP 46 communicates with the AVS units 24 and with the CDC 22.

Figure 3:
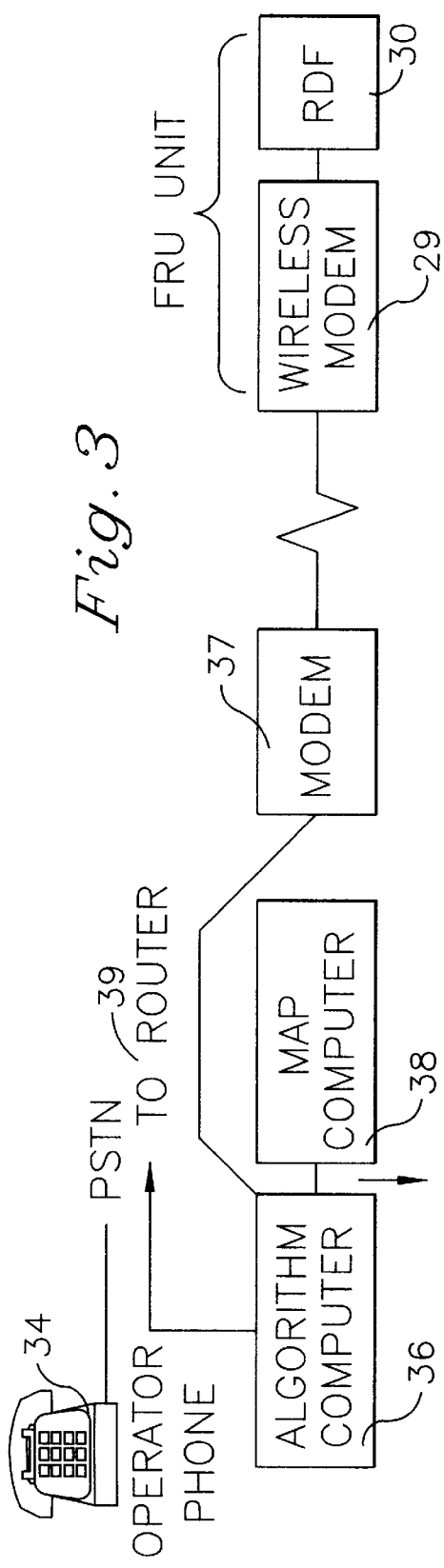
FIG. 3 is a schematic block diagram of workstation at the central monitoring station or communication and dispatch center of the location system.

One CDC workstation 32 is illustrated in more detail in FIG. 3. As illustrated in FIG. 3, each workstation includes an operator phone console 34, an algorithm computer 36, and a map computer 38. A router 39 is linked to each CDC workstation computer 36, and operates to link the computer 36 via modem 42 at the CDC and modem 43 at the local computer to the SIP 46. Each computer 36 also has a second modem 37 which links the computer to the radio direction finder unit 30 in a field response unit, via a wireless modem 29 connected to unit 30 in the vehicle. Telephone console 34 is an ordinary wire-line telephone with conferencing capabilities. A universal call distributor of a type well known in the communications field is also provided at the central monitoring station for transferring incoming calls to the least busy of the workstations 32. All of the workstations 32 are connected via a local area networks or LANS 31 and 40. One LAN connects all algorithm computers 36 through router 39 to their local computer or server 31. Another LAN connects all the map computers 38 to a server 40 containing digital maps of various areas in the network and other images for driving a computer map display.

The AVS units 24 in the location system each include a modem 44 for linking with the CDC 22, either via direct modem-to-modem communications, or via modem 45 and the local computer 26, as illustrated in FIG. 2. Typically, one local computer 26 will be provided per city. The location system includes a cell site database 48 in which the location coordinates for each cell site in the network are stored, and a neighbor data base 49 in which the neighboring cell sites to each cell site are stored. These two data bases may be linked to the local computer 26 as illustrated in FIG. 2, or alternatively the cell site and neighbor data bases may be provided at the CDC 22.

Figure 4:
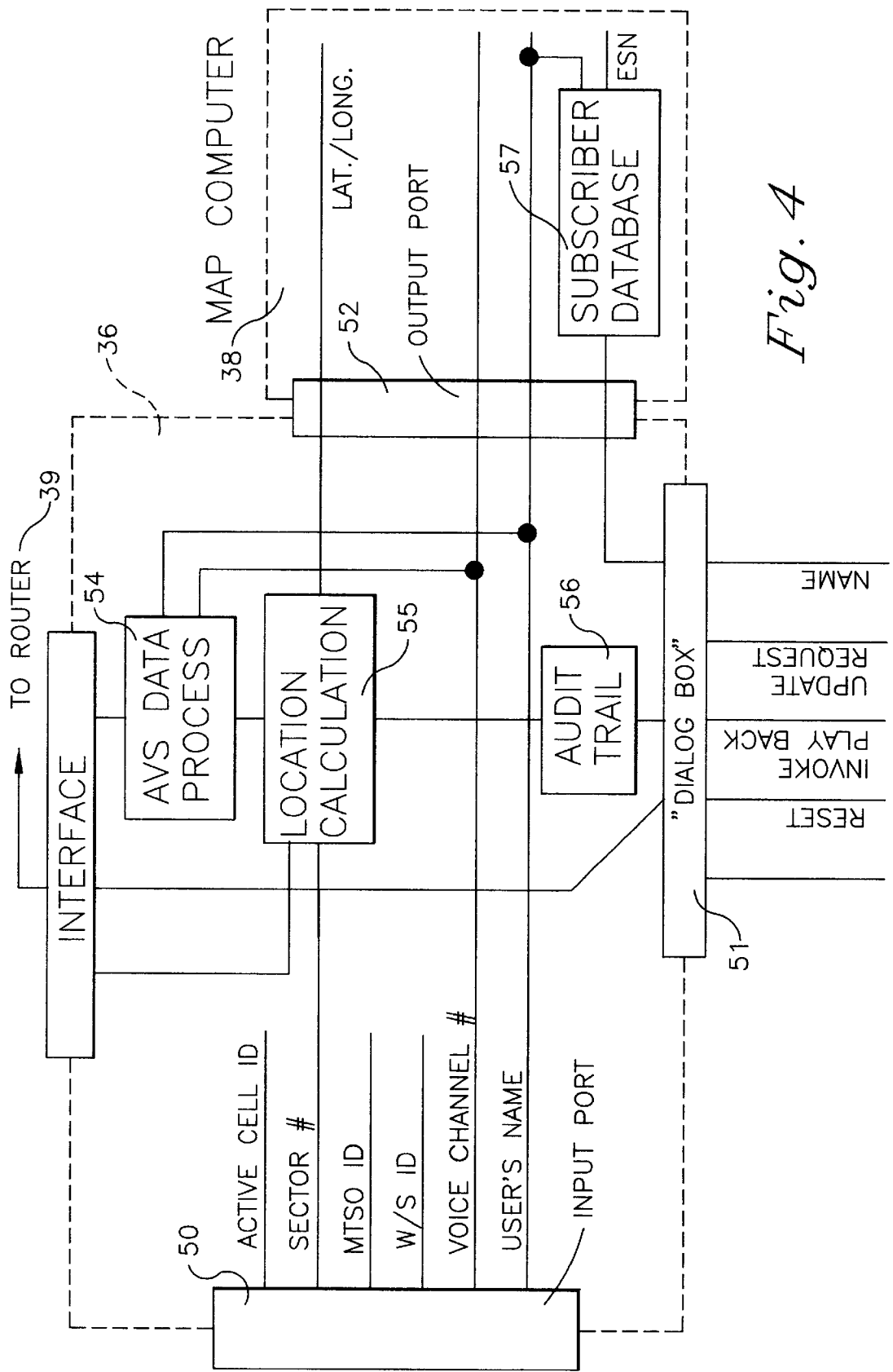
FIG. 4 is a block diagram of the location processing or algorithm computer at a workstation.

FIG. 4 schematically illustrates the hardware/software modules residing in the CDC workstation algorithm computer or its periphery. These modules comprise the algorithm computer 36 and its interfaces to the local computer, the AVS units and the co-resident map computer 38. These modules will be described in more detail below. The modules include an input port 50 providing an interface between the algorithm computer and local computer via modems or a LAN connection, and a dialog box 51 which comprises a menu for invoking various activities. The computer 36 also includes an output port 52 connecting the algorithm computer 36 to the map computer 38 via a RS-232 full duplex interface. Other modules are the interface 53 to the local computer via router 39, the AVS data processing module 54, the location calculation software module 55, and the audit trail module 56. A subscriber data base 57 is also stored in the map computer 38.

When a call for help is routed to one of the workstations 32, the operator will proceed to communicate with the caller via the public switching telephone network or PSTN, in other words the network illustrated in more detail in FIG. 1, comprising the telephone company central office 14, telephone lines and wireless telephone links through which each subscriber can call any other subscriber in the network. The operator will ask for the caller's name and the reason for the call. The subscriber data base 57 is provided in the map computer LAN server, accessible via the map computer 38 at each workstation, as illustrated in FIG. 4, and the operator may access this data base to extract the subscriber's information, such as NAM or caller phone ID number or, in areas where ANI (automatic number identification) is available, the NAM can be automatically accessible by the system.

As noted above, each cellular system includes a plurality of cell sites 10 each covering a predetermined area, and groups of cell sites are all linked to one of a series of MTSO or network switching computers. When a call for help is made from a mobile phone unit, the cellular network automatically assigns the call to the cell site 10 detecting the highest received signal strength (RSSI), known as the active cell. The network switching computer or MTSO for the active cell may trap the call particulars of any incoming call, including calls to the central monitoring station, by invoking an automatic "call trace" request. This results in the extraction and storage of pertinent information regarding a particular call, including the active cell ID, the initial voice channel number assigned to the calling phone, the sector number of the incoming call, the network switching computer ID, and the subscriber's NAM. Each cell site is divided into sectors or pie segments, which are identified by number, and this sector number is also provided in the trapped record. The network switching computer or MTSO may be programmed to trap and dump calls automatically to the local computer, or the local computer may request the MTSO a particular NAM call trace.

The operator at the workstation to which the call is assigned in turn will request the local computer to transmit the data associated with that NAM, and the operator will therefore receive the active cell and sector information for that call, which is used as described later as a check on the validity of a calculated phone location.

The AVS unit 24 will now be described in more detail, with reference to FIGS. 5–7. The AVS or agile vector sensor unit 24 is designed to scan all cellular channels, to capture the current voice channel assignment for each call, to detect and store the azimuth and RSSI (signal strength) of all detected calls at periodic intervals, and to detect changes in voice channel (RVC) assignment. The latter function is critical since the voice channel assignment for any call may be changed by the network switching computer several times during the call. The information is captured and stored, and then another scan is made and the information is written over with the new set of detected information, when the AVS is in a stand-by mode. In active mode, the information stored is transmitted to a CDC workstation at the central monitoring station, as described in more detail below.

Figure 5:
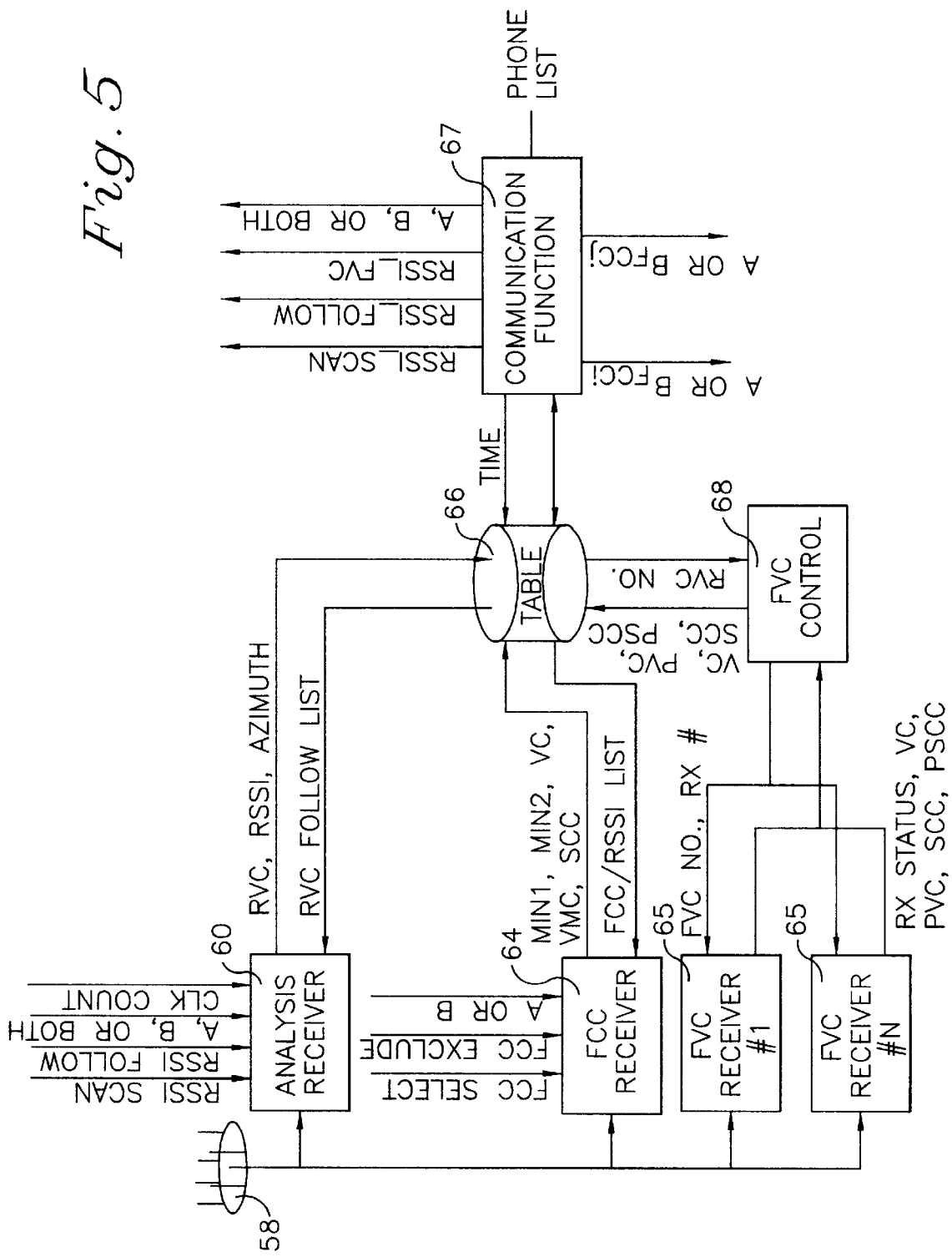
FIG. 5 a block diagram of one of the agile vector sensor units of the location system.

The AVS unit 24 is illustrated in more detail in FIG. 5. Each unit basically comprises a scanning antenna head 58 as used in a conventional direction finder, an analysis receiver 60 including an automatic tuner, a forward control channel (FCC) receiver/scanner 64 and a set of four or more forward channel receiver/scanners 65 connected to controller 68. Additionally, a data storage unit 66 receives input from all other units of the AVS, and provides data to the other units, and a communication module 67 receives commands and data from the SIP 46, and transmits collected data to the SIP 46, as described in more detail below. In the "idle" mode, each AVS unit scans all calls connected to the control channel of its cell site, and collects and stores data regarding the calls, and also tracks all calls using radio direction finder technology. At any one time, there could be up to sixty such calls connected to any one cell site. The information collected by the AVS unit can be used if required to locate the position of the portable phone unit from which any incoming call originates.

The antenna head 58 is a conventional radio direction finder antenna head with a central reference antenna and a six antenna array for sensing phase shift and thus allowing the azimuth of any incoming signal to be determined by analysis receiver 60. Antenna head 58 scans all forward voice channels, return voice channels, as well as forward control channels, and detects the presence of RF energy in any channel. Any signals are provided to the analysis receiver, which determines the RSSI or received signal strength of each channel detected. The antenna head 58 also provides a reference signal and a phase shifted signal to analysis receiver 60, so that the analysis receiver may determine the azimuth from each calling cellular phone to the AVS unit. This is done by comparing the reference signal to the phase shifted signal.

The analysis receiver 60, FCC receiver 64 and FVC receivers 65, are each functionally similar to a conventional cellular phone receiver, and are electronically tunable to any of the channels in the cellular analog spectrum. Each forward receiver is tunable to any forward control or voice channel in the cellular analog spectrum. Similarly, the analysis receiver/scanner 60 is used to scan and tune to reverse voice channel frequencies, and is also functionally similar to a conventional cellular phone receiver, and is electronically tunable to any of the reverse voice channels in the cellular analog spectrum.

The analysis receiver 60 is commanded via the communication interface 67 to scan all the reverse voice channels for one or more cellular providers in the test or inactive mode. In this mode, the receiver 60 periodically scans all the reverse voice channels and provides to the data storage unit or table 66 the time of each measurement, the channel numbers, and the corresponding RSSIs. This information is stored in a table 66 as illustrated in FIG. 6. For all RVCs detected which meet a minimum RSSI threshold, the analysis receiver 60 also determines the direction of arrival (azimuth), and provides updated RSSIs along with the channel number and azimuth for storage in the table. Table 66 has a first column 71 for entry of time stamp, a second column 72 for entry of channel number, a third column 73 for entry of RSSI, and a fourth column 74 for entry of azimuth, and information received from the analysis receiver is entered in these columns. The other columns receive data from the FCC and FVC receivers, as explained in more detail below.

At periodic intervals, the RSSI and azimuth of all channels listed in the table is again determined, and the updated data is provided to the table. The process is performed for all channels from the first entry to the last in the table, and then repeated immediately at a maximum scan time of once every second.

The FCC (forward control channel) receiver 64 selects forward control channels to be monitored and also decodes the data necessary for tracking a call as it changes voice channels. Each AVS unit may include more than one FCC receiver if necessary, and may handle up to four receivers 64. The FCC selection comprises the steps of completely scanning all the control channels designated for the operator providing the cellular service. If subscribers for more than one cellular carrier are to be tracked at the same AVS unit, it will be provided with a second set of FCC receiver hardware and software for channel selection. If multiple FCCs are present at a site, a corresponding number of FCC receivers will be provided.

In determining the FCC to be demodulated and decoded, the FCC receiver may be programmed to either search for the highest strength channel not on an exclude list, or may select a channel specified on an FCC select list. The receiver continuously monitors changes in FCC levels every 2 minutes, and re-initiates selection on power up, loss of decoding for two contiguous minutes, five consecutive scans indicating a stronger RSSI on a different control channel, or a command from the SIP to exclude an FCC or select a particular FCC. The channel number of the FCC being monitored is provided to the communication module 67 on power up and whenever there is a change in channel selection.

The FCC receiver continuously demodulates and decodes the selected FCC and determines the following parameters for all calls originating at or directed to cellular units in the vicinity: MIN1, MIN2, VMAC, VC, SCC.

MIN1 and MIN2 make up the NAM or cellular phone address. This is only available for calls initiated at the site where the AVS unit is housed. VMAC is a command sent by the cell site to provide an attenuation setting for the cellular unit. Typically, the cellular unit will be commanded to drop power as the unit approaches the cell site. VC provides the current voice channel number of the unit being monitored, and SCC provides the color code of the supervisory audio tone (SAT).

All of this data is transferred to table 66, as illustrated in FIG. 6. MIN1 is entered in column 75, MIN2 in column 76, VMAC in column 77, VC in column 72, and SCC in column 78. If multiple FCC receivers are provided to decode different FCCs at a single site, the channel number selected by each receiver is provided on the FCC exclude list of the other receivers, so that only one receiver will be decoding information on a particular control channel at any one time.

The FVC receivers 65 demodulate and decode data received over the FVC in order to detect hand-over commands as well as power control messages transmitted to the cellular phones from the cell site. Tracking the hand-overs is very critical, since the initially assigned voice channel (RVC) for any call may be changed several times during the call. The FVC controller 68 assigns forward voice channels corresponding to the entries in column 72 of the table 66 to the FVC receivers in turn, in a round robin fashion, so that the next available receiver is selected to decode and demodulate the signal in the respective channel. Any change in channel assignment will produce a data burst and resultant energy change in the channel, which will be detected by the assigned FVC receiver. The FVC data burst is transmitted for a short duration, around 100 msecs, at a rate of 10 kbps, on the same frequency as the forward audio signal destined for the cellular phone. Cellular receivers currently on the market require the decoding of at least half the data packet before making a decision on the correctness of the command received. Thus, the operating window for the FVC receiver must be a minimum of 60 msec. In view of the large number of channels to be monitored by each AVS unit, several FVC must be provided, and additionally, the FVC receivers are controlled to limit the amount of time a receiver decodes a channel when there is no data present. Controller 68 can handle up to eight FVC receivers, and each AVS unit will include a minimum of four FVC receivers. Each FVC receiver preferably comprises a Philips UMA 1000LT chip.

On command from controller 68, an FVC receiver will send an acknowledgment indicating its state to the controller. If it is not busy, it will then open a 1 msec window to detect any data presence on the assigned forward voice channel. If data is detected, the receiver continues to decode the data until either a false alarm is detected or 60 seconds have elapsed. Hand-off and change power messages will be decoded and the following decoded information will be sent back to controller 68:

VMAC

VC (which is the new voice channel assignment)

PVC (previous voice channel)

SCC (color code)

PSCC (previous voice channel color code).

This information will be transmitted by controller 68 to the data storage or table unit 66. The new voice channel or VC will be entered in column 72, VMAC will be entered in column 77, and SCC will be entered in column 78. Previous voice channel is entered in column 79, and previous color code is entered in column 80.

False alarms may be detected using the RXCTRL or pin 5 of a UMA 1000LT chip. Once data is detected, decoding continues for a maximum of 60 seconds, as noted above. A false alarm detection capability will shorten the busy period of a receiver under a false detect scenario. The receiver monitors the RXCTRL line of the UMA1000LT chip for approximately 15 msec after the data detection time. If the output is low level, this indicates the presence of data and thus will not change the decoding activity of the receiver. However, if a high level is detected, this indicates the presence of an audio signal and thus will lead to the termination of the demodulation and decoding process and the return of the receiver to the pool of available receivers.

If no data is detected in an assigned voice channel by an FVC receiver within the allotted time, the receiver sends a message to the controller to indicate its availability for processing another channel.

FIG. 6 gives an example of a sequence of data entered in table 66 and received from the analysis receiver 60 and FVC controller 68 in the manner described above. It can be seen that no hand-overs have yet occurred for channels 1,2,7 and 100, while channel 25 has undergone at least one hand-over.

The table entries are updated as new information is received by any of the receivers or from the local computer SIP via communication unit 67. All updates will change the time stamp in column 71.

The communication unit 67 is responsible for receiving and distributing data packets from the SIP 46 and for distributing table information and diagnostics results from the AVS unit to the SIP 46. All data packets transmitted to and from the AVS unit preferably contain a two-byte CRC for error detection. The SIP sends a control message to one or more selected AVS units. The SIP may control the AVS unit simply to transmit all contents of the table to the calling SIP. The SIP also sends a control function as appropriate to stop data transmission. Additionally, the SIP may send instructions to the AVS unit to search for a specific NAM (MIN1 and MIN2), or to track a specific voice channel. The SIP may also send other programming instructions to the AVS unit, or instruct the AVS unit to transmit a diagnostics record.

If an AVS unit is instructed to search for a specific MIN1, MIN2, the table will be searched for this MIN and, if found, data available on the requested MIN will be transferred to the SIP, as well as data on any other requested MINs and VCs. If a VC track command is received, the table will be scanned for this VC and data corresponding to the requested VC will be transmitted. It should be noted that, in the case of channel 25 in table 66, the actual channel requested by the SIP would be the previous voice channel, channel 7. Thus, both the PVC and the VC columns of table 66 must be scanned. If a change in voice channel is found, the most current voice channel is transmitted along with the previous voice channel, and all collected data in the current voice channel.

All AVS units in the system will continuously collect data on currently connected calls and this data will be stored in a table form as in FIG. 6. Collected data will be written over periodically if the unit remains in an idle state and is not requested to transmit information by any SIP. At any time, every AVS unit will contain information on all connected and detected calls, including the NAM or MIN1, MIN2, the signal strength (RSSI), the azimuth, any previous voice channel and color code, current voice channel and color code, and VMAC. The most important ability of the AVS unit is the ability to track voice channel reassignment in real time. Without such information, the collected data would be useless since the NAM may not be valid.

Thus, any AVS unit at every cell site in the cellular network will be continuously collecting and storing the data indicated in FIG. 6 for all calls currently connected to that cell site. When the central monitoring station has received a call for help, the operator will know the caller's ID or NAM as well as the active cell ID from the information collected from the local computer. The CDC workstation will send a coded request to the AVS unit of the active cell site to transmit the currently stored information on RSSI and azimuth for that NAM, as well as the current temperature at the cell site. Alternatively, the AVS unit may be instructed to send all stored information for all calls, and the information relating to the NAM of interest may be extracted at the CDC workstation. The AVS unit will then enter an "active" mode in which it transmits voice channel, azimuth, RSSI and temperature continuously every several seconds until turned off by the CDC workstation. The CDC workstation will also send a request to all neighboring cell sites, i.e. cell sites adjacent the active cell, as determined from the cell site database (see FIG. 4), to start scanning for all strong control channels, or for a specific voice channel, because the subscriber phone may move at anytime from one cell area to another cell site area in the neighborhood, without any warning. NAM and initial voice channel assignment, as well as voice channel reassignment, must always be found as soon as possible. Alternatively, neighboring cell sites may be requested to tune to the current voice channel for the NAM of interest, based on the information extracted from the active cell site's AVS unit, and will then start to scan this reverse voice channel and store and transmit information on the RSSI and azimuth for the calling phone relative to the neighbor cell sites.

Figure 7:
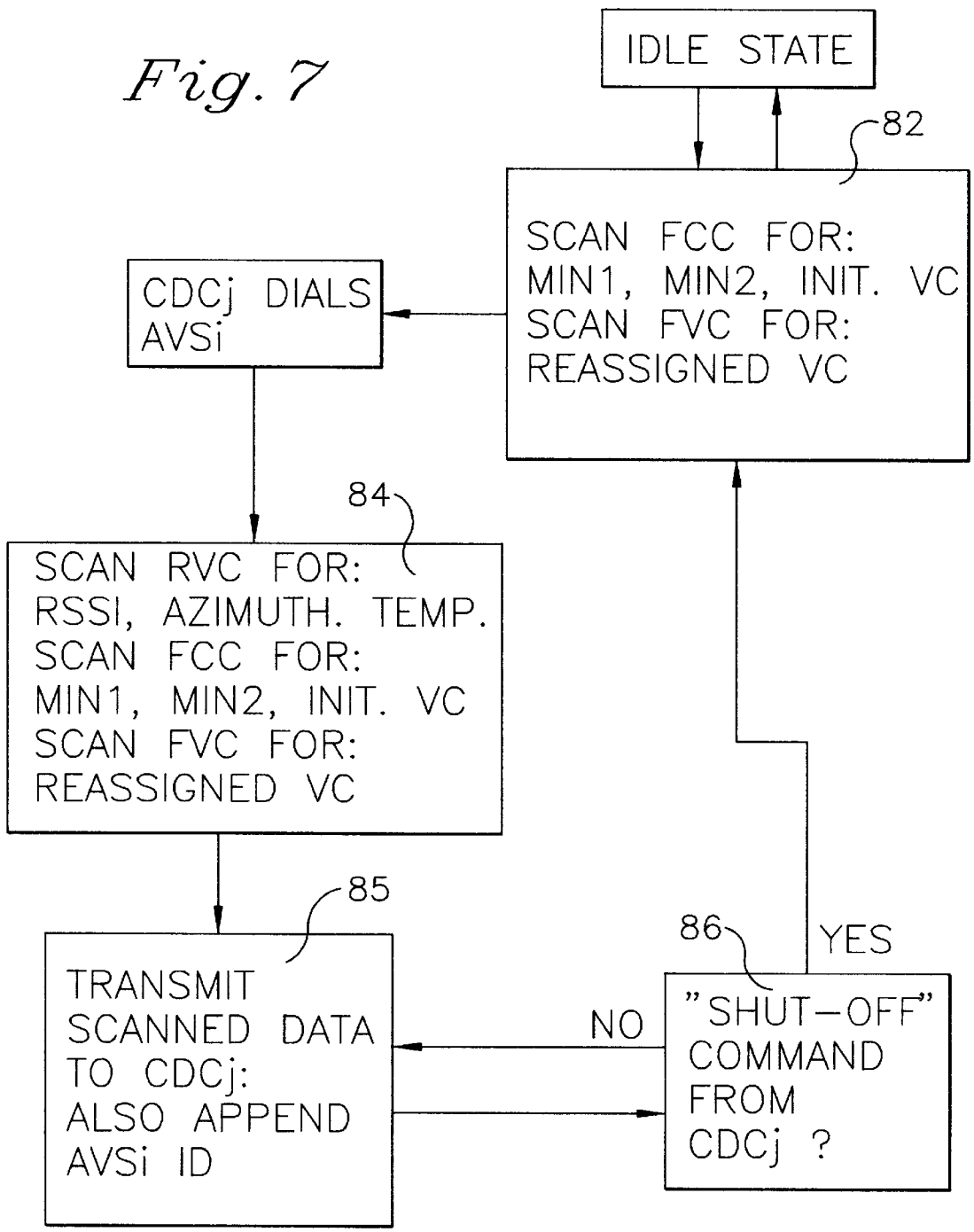
FIG. 7 is a schematic flow diagram of operation of an agile vector sensor unit.

This process is illustrated in more detail in the flow diagram of FIG. 7. In the idle state 82, the AVS unit scans the forward control channel receiver for MIN1 and MIN2, i.e. caller's NAM, and initial voice channel assignment, and scans the forward voice channel receivers for reassigned voice channels. This information is continuously stored and over-written in the idle state, as described above. If a CDC workstation dials the AVS unit (step 84), the unit scans the reverse voice channels for RSSI, azimuth and temperature, scans the FCC receiver for NAM and initial voice channel, and scans the FVC receivers for reassigned voice channels. The scanned information is transmitted to the CDC workstation (step 85), along with the identification number of the AVS unit. If a shut-off command is received from the CDC workstation (step 86), the unit returns to the idle state. Otherwise it continues to scan and transmit information to the CDC workstation at periodic intervals. When the CDC workstation contacts a neighboring cell site and instructs it to scan for a certain NAM or voice channel, the same procedure is followed except that the agile vector sensor unit (AVS) scans the voice channel received from the CDC workstation for RSSI, azimuth and temperature and continuously transmits this information to the CDC station.

As an alternative to the above procedure, in which the CDC workstation obtains the active cell site information from the MTSO and then commands the AVS unit at that cell site to transmit scanning information, the CDC workstation may instead broadcast a message to all AVS units asking whether they have stored information on a certain NAM. Any AVS unit currently detecting that NAM will then transmit stored information to the AVS unit. The CDC workstation will still need the ability to connect to the MTSO via the local computer in case the voice channel for that NAM is lost.

Neighbor cell AVS units will also be activated to scan for the same call. In other words, the CDC workstation will issue a command to all AVS units mounted on neighboring cell sites to send back a reading of their RSSI and azimuth to the calling phone, using the voice channel currently assigned to the calling phone as a beacon for targeting the neighboring cell AVS units. The information received at the CDC workstation from the active and neighboring cell AVS units is used to find the most probable location of the calling phone which initiated the call. The CDC workstation algorithm computer or the local computer maintains an updated database of active cell ID and latitude and longitude coordinates. The algorithm computer software will also determine the list of neighbor cells to be activated, i.e. a list of neighbor cells within a certain radius and/or sector in relation to the active cell for the incoming call. The computer transmits a message to all neighboring cells enabling them to transmit the azimuth, RSSI, temperature and other cellular network parameters for the currently assigned voice channel on an ongoing basis until the event is completed. Temperature is needed since signal strength will vary with temperature, and a correction is made to the RSSI based on temperature in the subsequent analysis.

Operation of the CDC workstation algorithm computer will now be described in more detail with reference to FIG. 4 and FIGS. 8–12. The CDC workstation algorithm computer 36 serves as the hub for a number of simultaneous activities, initiated from the outside or by computer 36 itself. The objective of computer 36 is to control when and where to collect data so that a real-time assessment of the most probable location of a cellular phone initiating a help call can be made.

The dialog box menu on the computer screen will include boxes for subscriber name entry, updated record request entry, invoke playback entry for audit purposes, invoke diagnostics entry for one or more AVS units, and a terminate run entry for ending or cutting off input from AVS units.

Figure 8A:
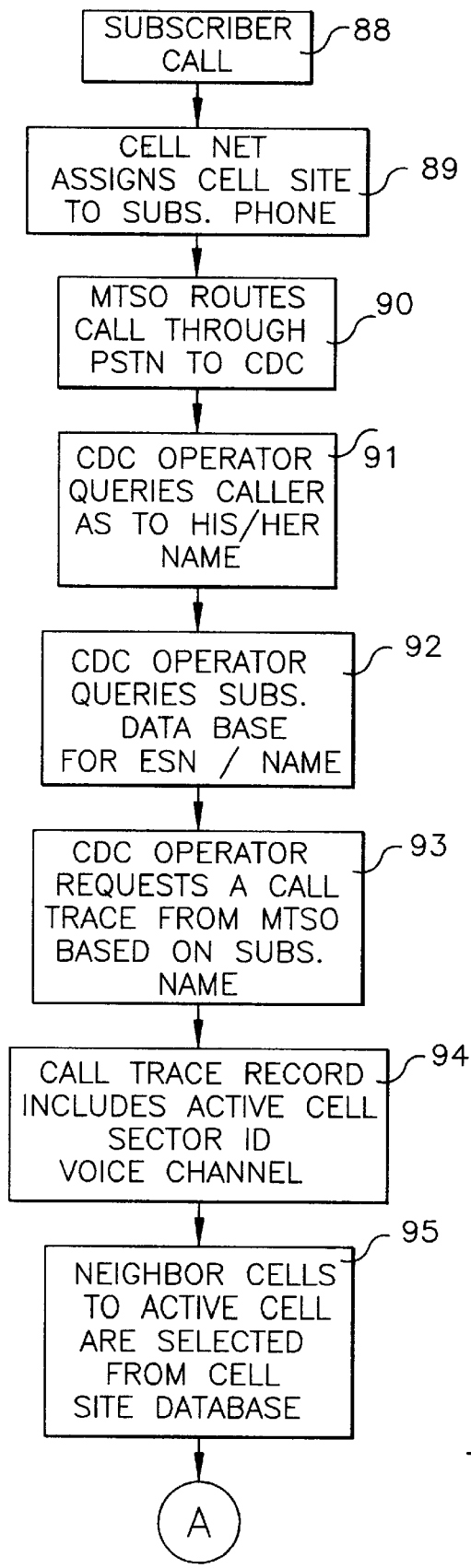
FIG. 8 is a schematic flow diagram of the location system.
Figure 8B:
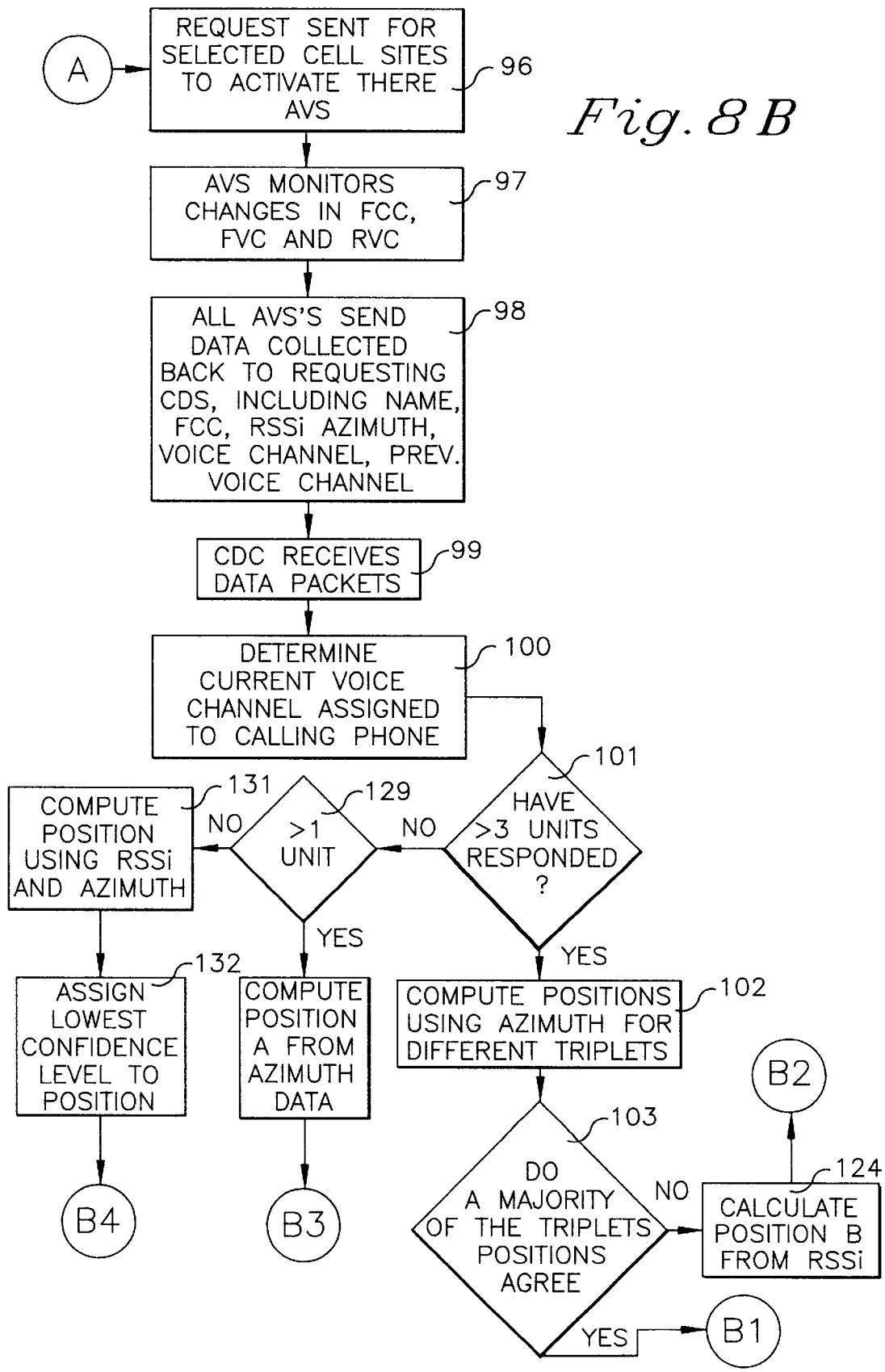
Figure 8C:
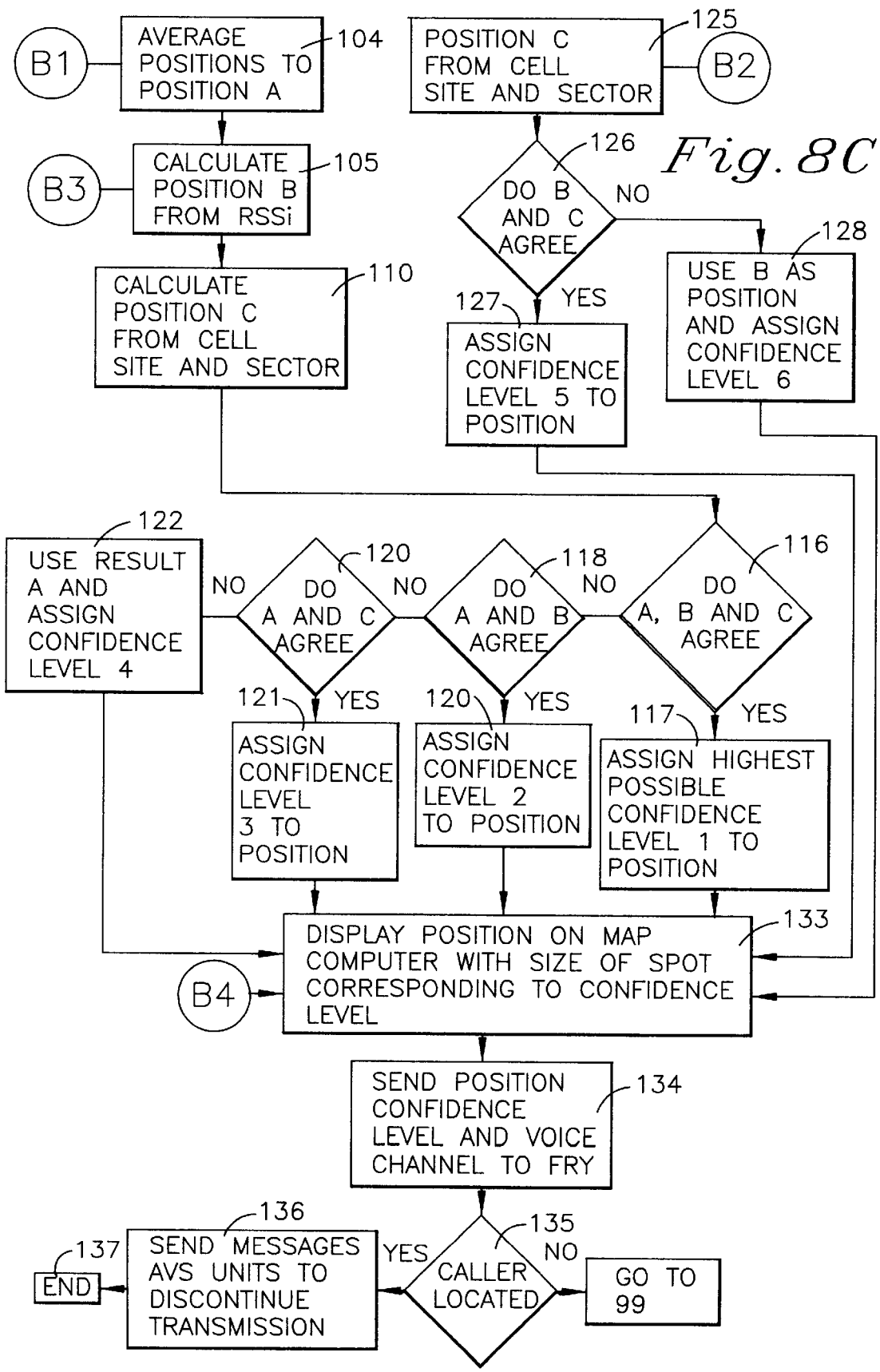

FIG. 8 is a flow diagram which schematically illustrates the steps which are carried out in a location procedure using the system of FIGS. 1–7. When a subscriber initiates a call (step 88) to the CDC, the cellular network will assign a cell site to the calling cellular phone (step 89). The MTSO will route the call through the PSTN (public telephone network) to the CDC 22 (step 90).

When a voice call is received at the dispatcher telephone console, the operator will request the caller's name (step 91)

and enter this information at the appropriate dialog box. This produces an automatic request to the local computer via input port 50, transmitting the subscriber's NAM as well as the workstation ID to the local computer. If the caller is unable to communicate, the operator may still be able to determine the NAM if the telephone company has ANI or automatic number identification. If this system is in place, the calling phone number will be displayed at the CDC terminal, and can be used to recover the NAM. The subscriber's NAM is found from the subscriber database 57 (step 92). The CDC operator will request a "call trace" record from the MTSO based on the subscriber's NAM (step 93). When the MTSO finds a match between the requested NAM and one of the NAM's stored in "call trace" records, it will send the pertinent data for this NAM gathered at the MTSO back to the CDC workstation computer 36 (step 94). The call trace record includes the active cell ID, sector ID and voice channel.

Each local computer is connected to one or more network switching computers or MTSOs, which may be programmed to download trapped "call trace" records automatically to the local PC, which may be co-resident with the network switching computer or linked remotely to the MTSO or network switching computer. Alternatively, the local computer may request an MTSO to transmit call trace records for a specific call or NAM. The local computer performs a series of tasks. First, it will strip away all unwanted fields from the "call trace" records and store only the active cell ID, the voice channel assignment, the sector number, the network switching computer ID, and the subscriber's NAM. Secondly, it matches any call from a CDC workstation with its buffer area of trapped calls. Thirdly, any matched NAM request from a CDC workstation with one of the trapped or requested calls will result in automatic transmission of the following data to the workstation:

Active cell ID

Voice channel assignment

Sector number

ESN/NAM

MTSO ID

The operator at the CDC workstation may also initiate an update request to the local PC at the dialog menu 51, if the AVS unit loses the voice channel tracking. The local PC will perform the same matching process in the case of an update request, and transmit matched NAM data back to the CDC workstation.

The trapped data for the requested NAM is transmitted back to algorithm computer 36 via input port 50. The workstation ID is used as a return address from the local computer to the appropriate CDC workstation when the local computer sends the requested data back to the workstation computer. This may be taken care of by a LAN arrangement.

On receipt of the data from the local computer, the algorithm computer determines the neighboring cell sites from the active cell site and the neighbor location database (step 95). The AVS data processing module functions to select the nearest 10 to 15 cells to the active cell by incrementally increasing the radius of an imaginary circle about the active cell until the desired number of neighbor cells is included. The latitude and longitude coordinates of the active cell are obtained from the cell site database 48, and as the circle is increased to encompass other latitude and longitude coordinates, data base 48 is searched for other cell sites within those latitude and longitude coordinates. The cell site database also includes the AVS unit phone number for each cell site. The AVS telephone number for the active cell unit and selected neighboring cell units is then applied to interface module 53, and the AVS phone numbers are automatically dialed. At the same time, the list of neighbor cells and cell coordinates is transmitted to the location calculation module 55 for verifying calculated location, as will be described in more detail below.

The calls automatically made to the active cell AVS unit and the neighboring cell AVS units activate the AVS units (step 96) so that they monitor changes in FCC, FVC and RVC (step 97), and begin transmitting the collected data back to the CDC workstation computer via input/output module 53 (step 98), including FCC channel, NAM, RSSI, azimuth, voice channel, and any previous voice channel. Alternatively, the algorithm computers may be connected to a router 39 which, in turn, is connected to the local computer SIP 46, and the local computer SIP 46 is connected to the AVS units. The calls link the respective input/output modems to the respective AVS unit modems 44 for communication of data to and from the respective AVS unit until a reset command is received from dialog box 51 or automatically to shut off communications and return the AVS unit to its idle state. During the period that an AVS unit is connected to the algorithm computer, the AVS unit will transmit a data packet to the algorithm computer every 5–10 seconds. The data packet will be made up of all scanned MIN1, MIN2 (NAM) and initial voice channel numbers, updated voice channel numbers, and the respective RSSI and azimuth readings collected by the AVS unit as described above. The AVS data packets are transmitted to the AVS data processing module 55 via interface module 53 in the CDC algorithm computer 36. Although in this example it is assumed that each AVS unit is transmitting collected data for all detected calls or RVC's, the system may alternatively be programmed to instruct each AVS unit to transmit collected data for only one NAM or voice channel.

The data packet transmitted to the requesting CDC workstation will have leading characters made up of the identifier of the AVS unit, the requesting CDC station ID and trailing CRC characters. There will be one record transmitted for each of the currently connected calls at that cell site as well as other records as a result of scanning other call's RVC's not originating at the active cell. Each record could possibly include MIN1, MIN2, voice channel, azimuth and RSSI. Scanning, processing and pointing will continue at each AVS unit during assembly and transmission of the data packet, ready for the next data packet assembly, so that tracking of voice channel reassignment will not be compromised.

Since AVS data packets are received by AVS data processing module 54 every 5–10 seconds, the processing time at this module and the location calculation module must be less than 5–10 seconds. Each AVS data packet is made of all calls currently connected to the particular cell site and other calls whose RVC is heard strongly enough at this cell site. For each call, a record comprising at least MIN1, MIN2, and current voice channel assignment is included in the data packet. MIN1 and MIN2 combine to form a NAM, and this NAM is matched by the module 54 to the subscriber's NAM previously obtained from database 57. Only one such match is expected among all the AVS's, and this record is filtered from all of the other call records for further processing. The voice channel's RSSI and azimuth readings are selected. The same selected voice channel is used to pick up the RSSI and azimuth readings for that voice channel at all the neighbor AVS units, so that one pair of readings for the voice channel identified is selected for each AVS data packet. The voice channel, AVS RSSI and azimuth readings are transmitted to the location calculation module 55 for further processing. Concurrently, the selected voice channel is routed to output port 52 for display on the map computer 38.

If a change of voice channel occurs due to a hand-off, another MIN1, MIN2 and voice channel triplet will match the subscriber NAM, and this new voice channel will determine which RSSI/azimuth readings are picked up by the AVS data processor for transmission to the location calculation processor.

The AVS data processor 54 also monitors the RSSI threshold for each selected AVS unit. If any of the selected AVS's is not sensing the originating cellular phone voice channel, it is removed from the list of neighbors to be dialled from module 53. If the active cell RSSI approaches a low level threshold, the program predicts an inter-cell handoff to one of the existing neighbors or another cell. The program therefore includes an algorithm for determining if the active cell RSSI is near to the low RSSI threshold, and for determining if another neighbor cell's RSSI is rising. The program also determines whether there is a need to retrieve another cell and dial to that cell's AVS unit so that it will be tracked in real time as well. The primary location calculation is derived in the location calculation processor 55 using the filtered data received from the AVS data processing modules. This will consist of the RSSI, azimuth and temperature readings of the currently assigned voice channel at the active cell site and neighboring cell sites.

Figure 9:
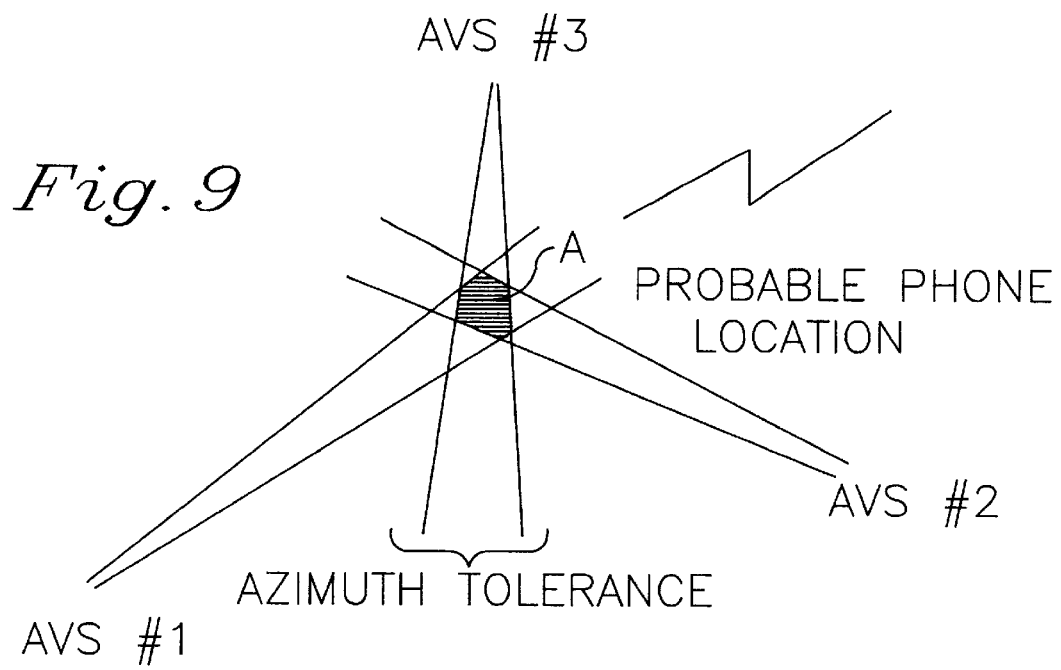
FIG. 9 is a graphical illustration of a triangulation process for determining an approximate phone position.

When the CDC workstation receives data packets (step 99), the program first determines the current voice channel assigned to the caller's NAM (step 100) from the data in FIG. 6. It is then determined whether more than 3 AVS units have responded to this particular voice channel (step 101). If so, the azimuth readings for each group of 3 AVS units polled is filtered by a Kalman filter and used to triangulate and find the smallest intersection area, i.e. the most likely location of the cellular phone (step 102). This is illustrated in FIG. 9 for the azimuth readings of three AVS units, AVS #1, #2 and #3. The CDC station algorithm computer will store the received information from the active and neighbor cells in a matrix or table. The azimuth angle accuracy for the selected call as received from the active cell AVS (AVS #1) and up to n neighbor cells will dictate the accuracy of the intersection area solution and this accuracy will decrease with distance of the cell sites from the calling phone. FIG. 9 illustrates the use of three azimuth readings, from the active cell and two neighboring cells, AVS #2 and AVS #3. These azimuth readings produce an intersection area A which is the probable phone location. Assuming azimuth information is received from n AVS units, and m out of the n readings create a reasonable intersection using triangulation as in FIG. 9, with m>n/2, then the area A location estimate is considered reliable. However, if less than n/2 of the azimuth readings intersect, the whole process is suspect and the most likely location must be determined in another way.

Figure 10:
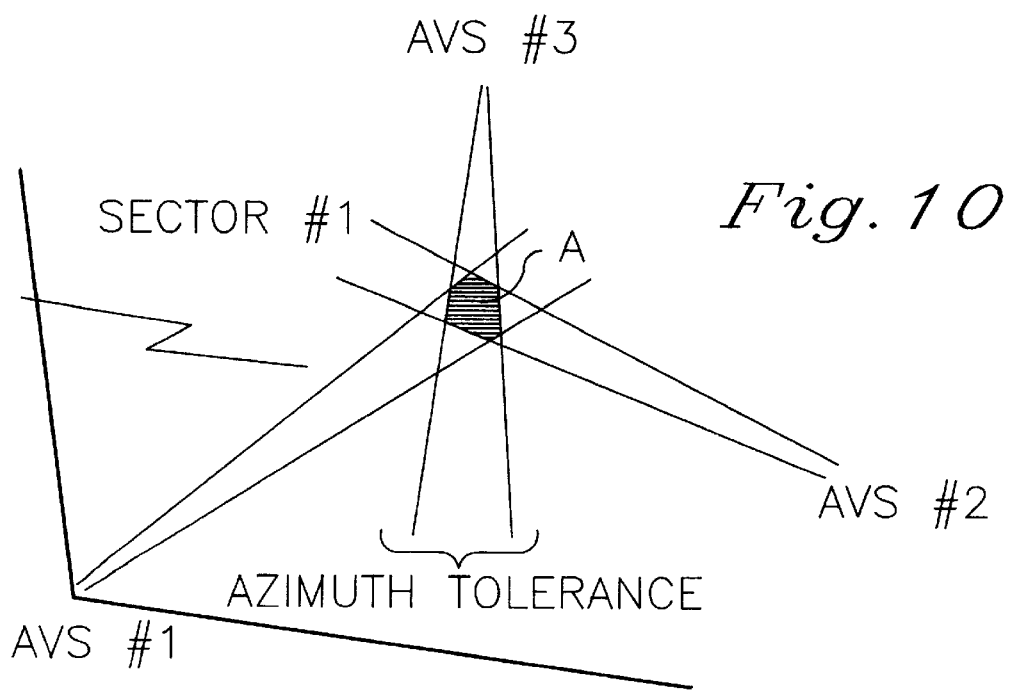
FIG. 10 is a graphical illustration of a procedure using sector information for checking a calculated phone position for accuracy.

Due to terrain, signal reflections and other obstacles, the azimuth reading accuracy may be suspect, and an additional check of the position is needed to be sure that the calculated location is correct. Active cell, sector number, neighbor cells and the RSSI levels at each AVS unit can all be used in this "sanity" check of the azimuth derived location. The sector information received from the local computer may be used to check a probable location estimate, as illustrated in FIG. 10, since erroneous azimuth readings may be produced in a reflection intensive environment. For every call, the local computer will transmit the sector number of that call, i.e. the pie-like sector depicting the general direction of the calling phone in relation to the active cell. Each cell site is divided into a number of sectors, typically three 120° arcs, and each connected call will be within a certain sector for the active cell unit, as established based on the direction of the incoming call.

Another approach in using azimuth for location calculations, is used for different combinations of triplets of AVS's "hearing" the calling phone voice channel. The computed positions for different triplet combinations are compared (step 103). If there is good agreement between a majority of the azimuth results, the computed positions which agree are averaged (step 104). Any positions not in agreement with the majority will not be used in the averaging step if they are in the "minority."

Figure 11:
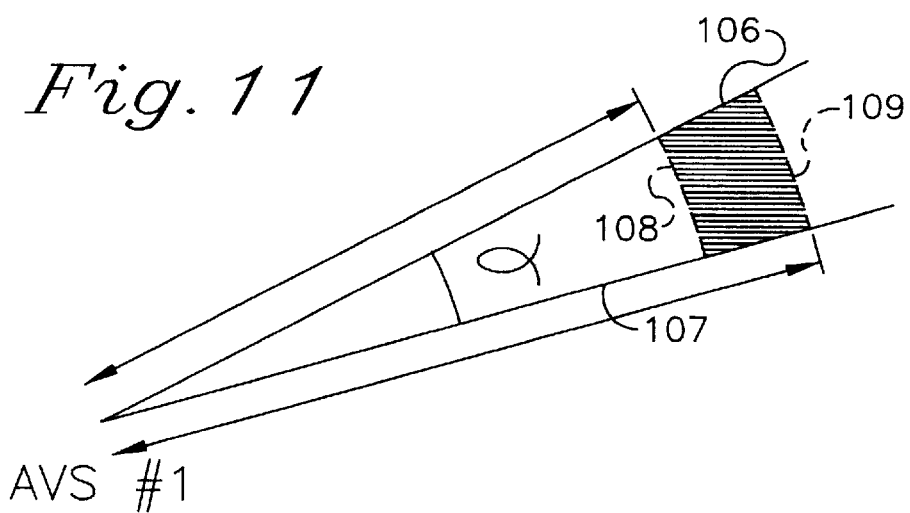
FIG. 11 is a graphical illustration of a procedure using signal strength information as an extra data reference to determine location.

Signal strength or RSSI information is then used to provide a rough approximation of distance from the cell site to the approximate location of the cellular phone, as illustrated in FIG. 11, providing an additional sanity check (step 105). The RSSI for the call detected by AVS #1 allows a distance estimate to be made, i.e. a range from a lower, or minimum distance to an upper, or maximum distance. Based on the azimuth tolerance $\alpha$, triangulation lines 106,107 are drawn from the cell site AVS #1. Lines 108,109 are drawn between lines 106 and 107 at the minimum RSSI distance and the maximum RSSI distance, respectively, which are calculated based on the stored RSSI and temperature data. The area B between lines 106,107,108,109 provides an approximate location area which can be compared with the previously calculated area A. A similar calculation can be made for the RSSI data collected at the neighboring cell sites.

The VMAC data from table 66 may be used as a "sanity check" of the RSSI result. As a cellular phone approaches any cell site, the signal emitted will become "louder." The cell site will therefore send a VMAC command via the FCC for the phone to drop its output power. This command may instruct the phone to drop power by up to 28 dB. Information on the power drop requested by the VMAC command therefore gives some idea of the distance between the phone and the active cell site. Software may be used to determine whether the distance indicated by the VMAC command is in agreement with the previously determined RSSI data. If the two results do not agree, the RSSI based location position is given a low confidence level or not used in the location calculation.

Figure 12:
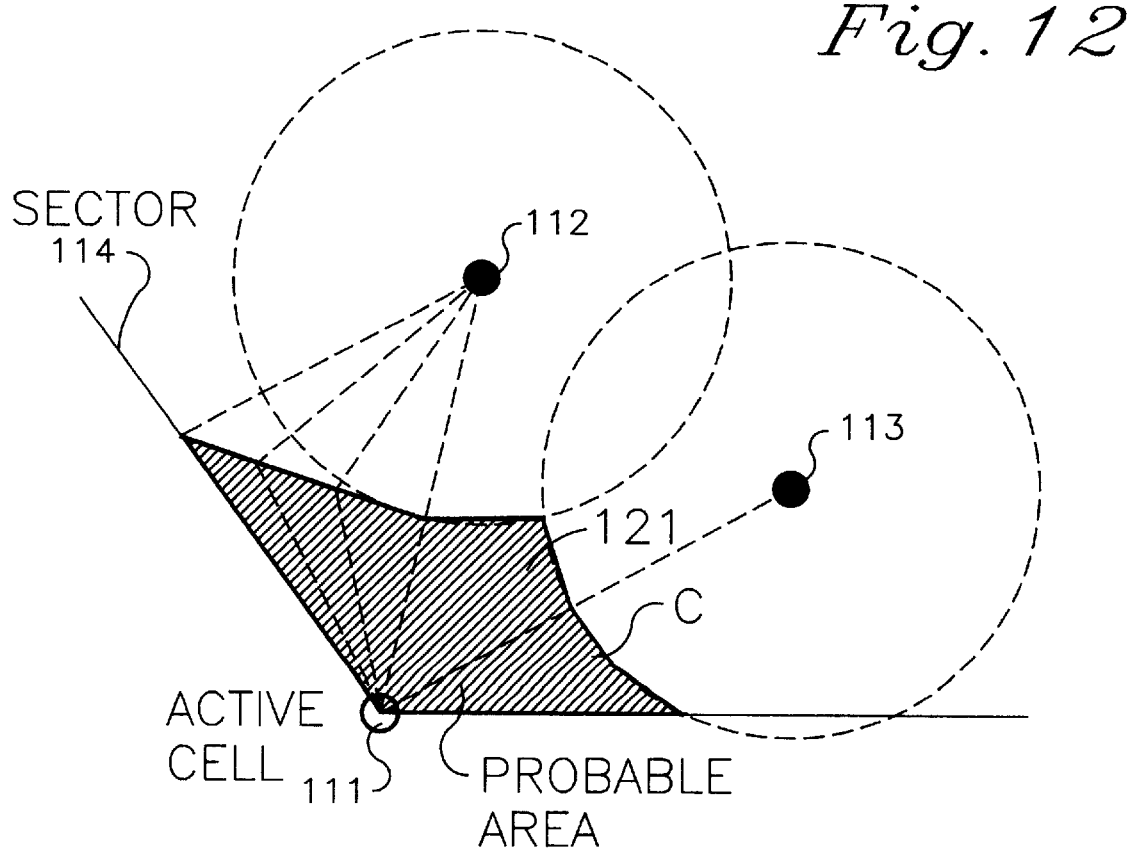
FIG. 12 is a graphical illustration of another location algorithm.

Approximate position C is then calculated from the cell site and sector information from the MTSO (step 110), as illustrated in FIG. 12. This involves the use of active cell location 111, neighbor cell location 112,113 and sector number 114 to determine a gross location or probable area C of the originating cellular phone. The area C is derived from the half way points of the boundary between the active cell and other cells in the sector, as illustrated by the dotted lines in FIG. 12 The location derived in this way is compared to the primary derived location according to FIG. 9 for reasonableness.

Once areas or approximate locations A,B and C have been calculated, they are compared to determine a confidence level for the determined position. If a majority of the triplet azimuth positions agree, and this position also agrees with position B and C (step 116), the highest possible confidence level 1 is assigned to the computed position (step 117). If all three results do not agree, but positions A and B do agree (step 118), a slightly lower confidence level 2 is assigned to the data (step 119). If only A and C agree (step 120), confidence level 3 is assigned, which is lower than level 2 (step 121). If A does not agree with B or C, the azimuth determined position is used as the location and is assigned a lower confidence level 4 (122).

If there is no majority agreement in the azimuth positions determined at step 103, the RSSI position (step 124) and the cell site/sector position (125) are still computed in exactly the same way. The results B and C are compared (step 126), and if they are in agreement, the result is used as the location and assigned confidence level 5 (step 127). If they do not agree, RSSI position B is used for the location and assigned a lower confidence level 6 (step 128).

In the situation that only three or less AVS units has responded, as determined at step 101, the system first determines whether more than one unit has responded (step 129). If so, the azimuth data from the responding units will be used to compute position A as in FIG. 9 (step 130). Positions B and C are calculated at steps 105 and 110, and positions A,B and C are compared. If they agree, the position will be assigned a confidence level slightly less than level 1, since only a single azimuth calculation has been made.

If only one unit has responded, location is computed using azimuth data filtered with a Kalman filter and the averaged absolute value of RSSI for distance from the cell site (step 131). In the case of only one cell site, RSSI is used in computing the initial position A and then position C is calculated and compared with position A. The location is assigned the lowest possible confidence level 7 (step 132).

Once the derived location has been checked for accuracy and assigned a confidence level, the latitude and longitude coordinates for the most likely location are transmitted to output port 52 and the map computer will display a red dot corresponding to the coordinates supplied from the location processor (step 132). The size of the red dot will indicate position confidence level. Confidence level 1 will produce a relatively small red dot, indicating good position accuracy. The dot size will increase with decreasing confidence level, so that the operator is immediately aware of how accurate the position is likely to be. The same procedure is followed each time a new data packet is received from the polled AVS units, providing constant updates of the calling phone position, which in turn are displayed on the map computer screen.

The coordinates derived by the location processor are also routed to the audit trail module 56. A separate file is stored by the audit trail module 56 for audit trail purposes. This file closes automatically when the operator terminates the location session.

Once a probable x and y coordinate location of the calling cellular phone has been determined, the operator will dispatch one or more follow-up vehicles 28 to the location displayed on the map computer. The follow-up vehicle will have a field direction finder unit 30 on board for tracking the signals emitted by the calling cellular phone so as to locate the precise position in x, y and z coordinates. Direction finder unit 30 is similar to a conventional direction finder, but the manual tuning device is preferably replaced with an automatic tuner, using known automatic synthesizer technology, linked via radio network (RAM or ARDIS with different radio frequency range than cellular so as not to interfere with the direction finder operation) to the CDC workstation handling the call. The CDC workstation will continuously send position, as well as the confidence level, the current voice channel and any voice channel changes via the link to the automatic tuner (step 134), so that the direction finder will automatically be tuned to the current voice channel for the call to be located. This will be much faster and more reliable than manual tuning, and is needed to ensure that the direction finder can tune to the current voice channel and any new voice channels that might result, since voice channel changes can occur very rapidly. The speed of this system in detecting such changes and transmitting them to the field response unit or vehicle to automatically tune to any new voice channel will allow for smooth, continuous and reliable display of azimuth and signal strength necessary for the RDF operations. Thus, the field response vehicle will be able to pinpoint the position of the calling phone and locate the caller quickly, by locking on to the reverse voice channel signal of that phone and tracking any changes in reverse voice channel on a real-time basis. The field direction finder unit preferably also has a map display on a lap top computer in the vehicle on which the calculated position can be displayed.

If the calling phone has been located (step 135), a message is sent to all AVS units to discontinue transmission to the CDC (step 136). The CDC workstation will return to an inactive mode (step 137). If the caller phone is not yet located, the system continues to receive data packets and compute location information, sending updated position coordinates and voice channel to the FRU.

One possible example of a real-time location tracking sequence is illustrated in FIGS. 13–16. In FIG. 13, the active cell is cell N, and three neighbor cell sites 1,23 and 150 have been selected as neighbors by the AVS processing unit. It should be noted that, in practice, a larger number of neighbor cell sites will be used, but three only are used here for simplicity. The RSSI is approximately the same for all four cell sites, indicating that the calling phone is roughly equidistant from all four sites, assuming flat terrain with minimal interference. The azimuth reading represents the clockwise angle off North. All four AVS units have readings at voice channel 2, which is the initial voice channel assignment for the call.

Now assume that the calling phone stays at the same location as before, but an intra-cell hand off has occurred, reassigning the call to channel 1023. This situation is illustrated in FIG. 14. All the RSSI and azimuth readings remain the same. The CDC workstation will be aware of the updated voice channel and will automatically tune the field response unit direction finder to track to the new channel frequency.

In FIG. 15 it is assumed that the situation of FIG. 14 has not occurred, but that the calling phone instead moves east, but is still connected to the original active cell N with the original voice channel 2 assignment. The RSSI readings will change, as will the azimuth readings. At this point, the AVS data processing module 54 of the CDC workstation software will determine that the RSSI reading of active cell N is becoming very low, and will also determine that the phone is moving further away from the other three AVS units 1,23 and 150. As a result of this, the CDC workstation makes a determination that more AVS units closer to the east direction of the original neighbors list of AVSs must be added to the analysis. Other neighboring AVS units can be determined from the neighbor cells database, and appropriate cells added to the list.

Assuming neighboring AVS unit i is added to the list, FIG. 16 illustrates collection of another set of data for the same call. An inter-cell hand-off also occurs and the CDC workstation determines that a new voice channel, #1, has been assigned to the calling phone. From the readings for all AVS units in voice channel 1, the CDC workstation software determines that cell site i is the new active cell, due to detection of a hand-off to a new site and due to the larger RSSI detected by that AVS unit for that voice channel. The other AVS unit outputs can also be used since they have meaningful readings on voice channel 1. The CDC workstation will also tune the field radio direction finder units to voice channel 1 frequency.

This procedure continues until the calling phone is located and the emergency is dealt with. At this point a command is sent to all activated AVS units to discontinue transmission (step 124).

The portable phone location system and method as described above does not require any specialized end-user equipment, but can be used to locate any conventional portable or cellular phone without modification to the phone itself. The system avoids most of the major drawbacks of previous location systems using cellular and other technologies, although it does require addition of equipment at each cell site as well as at one or more MTSO stations. As the phone moves, either due to the caller walking or driving a car, new data is transmitted to the central monitoring station so that a new calculation of phone location may be made on a real-time basis.

Knowledge of the current voice channel assigned to the calling phone will ensure that the field response unit, which is equipped with a field radio direction finder unit, can hone in on the currently assigned voice channel at all times, in order to pinpoint the exact location of the caller. Due to inter and intra cell hand offs, inherent in cellular networks, it is common for the voice channel assignment to be changed quite often. It is important that the field response unit has this updated voice channel information or the caller may not be found. This invention provides for automatic sensing of a voice channel change based on the AVS unit output.

This system provides for accurate determination of an area in which the cellular call originates, combined with tracking of current voice channel assignment so that a field response unit can be dispatched to that area and hone in on the voice channel frequency to pinpoint caller location in x, y and z coordinates. The reverse voice channel is the only signal emitted continuously by the cellular phone and which therefore acts as a beacon. This is a continuously available, unique identifying signal for tracking the caller's precise location in x, y and z coordinates. Thus, even if the caller is on a floor of a multi-story building, or in an underground parking lot, he or she can be located quickly.

In the embodiment described above, the location system is used to pinpoint the position of a portable phone after the caller has called the CDC 22 for help. The portable phone may have a so-called panic button and may be programmed to call the CDC phone number automatically if the button is pressed, so that the user may be able to initiate a call for help even if they are unable to talk with the operator for some reason. This system may be used in the event of any type of emergency, including medical emergencies and crimes. It may also be used if a caller becomes lost.

The location system may also be useful for other applications. One such application is cellular phone fraud, in which cellular phones are "cloned" by unauthorized individuals, who then use the phones to make unauthorized calls which cannot be billed. This system can be used to track down cellular phone clones. The cellular phone clone will be using the same NAM as a valid cellular phone user. The location system of this invention can be used to track down the location of any currently active NAM. Thus, if the same NAM is detected simultaneously for two different calls, it may be suspected that one of the callers is using a clone. Also, if a NAM is detected in the wrong city for the authorized user, a clone is also suspected. In either case, the location of the clone can be found on a real-time basis, making apprehension of the fraudulent user much more likely. Up to now, such clones are generally discovered, but not located. This system will allow clones to be detected and tracked down much faster than was previously possible.

Another possible application for this location system is in network management. The AVS units can collect all data at each cell site over a period of time, and transmit the date to the CDC station where a determination of peak load locations can be made. This will make the decision as to the need for additional cell sites to be made more easily.

Although a preferred embodiment of the invention has been described above by way of example only, it will be understood by those skilled in the field that modifications may be made to the disclosed embodiment without departing from the scope of the invention, which is defined by the appended claims.

We claim:

1. A wireless network-based tracking system, comprising:
   an array of fixed antenna sites each including means for receiving and transmitting wireless communication and control channel signals and forming part of a wireless communication network, each antenna site being associated with a predetermined area for wireless connection to portable transceiver units in said predetermined area, and for transmitting and receiving communication and control channel signals to and from portable transceiver units in said predetermined area;
   a plurality of agile vector sensor units, each agile vector sensor unit being mounted at a respective one of said fixed antenna sites and including scanning means for scanning said predetermined area over the frequency range of said wireless communication network and detecting reverse communication channel signals of any active transceiver units in the vicinity, analysis receiver means for determining the azimuth of any detected reverse communication channel signals, tracking means for detecting changes in reverse communication channel assignments for each connected call and storing new communication channel assignments, and means for storing an identification code for each active transceiver unit, and the signal strength and azimuth of signals received on the currently assigned communication channel for each transceiver unit connected to the antenna site; and
   a monitoring and locating means for locating the approximate position of any active transceiver unit in said network which is currently transmitting over a reverse communication channel, the locating means including means for determining the active antenna site for the selected transceiver unit, means for determining a plurality of neighboring antenna sites to said active antenna site, means for polling the sensor units at said active antenna site and neighboring antenna sites to transmit stored call information from said agile vector sensor units, including signal strength and determined azimuth of reverse communication channel signals received by said antenna sites for at least the selected active transceiver unit to said locating means, and means for determining from said transmitted information a probable x-y coordinate location area in which the selected transceiver unit is located.

2. The system as claimed in claim 1, wherein said monitoring and locating means comprises first processing means for linking to a series of mobile telephone switching offices in said wireless network for trapping call information for a selected transceiver unit identification code from said switching office, and a monitoring center including a plurality of workstations for locating a plurality of different calls simultaneously, each workstation including a location processor for determining a probable location area for a selected transceiver unit, and a map computer for displaying a map of the area, and each workstation being linked to said first processing means.

3. The system as claimed in claim 1, wherein the monitoring and locating means includes display means for determining and displaying the currently assigned reverse communication channel for any selected transceiver unit.

4. The system as claimed in claim 1, wherein each agile vector sensor unit scanning means comprises an antenna head for scanning all channels of a wireless communication system, said receiver means comprises a forward control channel receiver for receiving forward control channel signals and determining the transceiver unit identification code and initial communication channel assignment for each call, and a plurality of forward communication channel receivers for detecting changes in communication channel assignments and determining any new communication channel assignment.

5. The system as claimed in claim 4, wherein each agile vector sensor unit includes analysis receiver means linked to each of said receivers for receiving said identification codes, initial communication channel assignments and new communication channel assignments, and tuning means for automatically tuning said antenna head to each of said initial and new reverse communication channels in turn to determine a signal strength and azimuth for each of said communication channels.

6. The system as claimed in claim 1, wherein each agile vector sensor unit includes controller means for controlling said unit to operate selectively in an idle mode and an active mode, said unit continuously collecting data and writing over the previously stored data in said idle mode, and transmitting collected data to said locating means at periodic intervals in said active mode.

7. The system as claimed in claim 2, wherein said monitoring center has at least one telephone number in said network, and comprises means for receiving emergency calls to said telephone number from transceiver units in said network, and assigning each emergency call to a selected workstation for initiating a location procedure.

8. The system as claimed in claim 1, wherein said means for determining a probable location area comprises means for computing a first probable location from azimuth data from the active sensor unit and neighboring sensor units corresponding to voice channel signals emitted by the selected transceiver unit.

9. The system as claimed in claim 8, wherein said means for determining a probable location area comprises means for computing a second probable location area from signal strength data from each sensor unit corresponding to the voice channel of the selected transceiver unit, and comparing the first and second location areas for consistency.

10. The system as claimed in claim 9, wherein said locating means further comprises means for obtaining call trace information for said selected transceiver unit from a mobile telephone switching office of said telephone network, said call trace information including an active antenna site identification number, a sector number, and an initial voice channel for the identification code.

11. The system as claimed in claim 10, wherein said means for determining a probable location area further comprises means for computing a third probable location area based on the active antenna site and antenna site sector information received from said mobile telephone switching office, and comparing said first, second and third location areas for consistency.

12. The system as claimed in claim 1, wherein the transceiver unit is a portable phone.

13. The system as claimed in claim 12, including at least one mobile telephone switching office linked to said antenna sites for routing calls to and from portable phone units in said wireless telephone network, said switching office including storage means for trapping a call trace record on incoming calls, including an active cell ID, an initial voice channel assigned to each call, a Sector ID, and the identification code of the calling phone, said locating means including means for determining the identification code of the calling phone, means for obtaining from the switching office the call trace record corresponding to the determined identification code, the active cell site for the calling phone being determined from the call trace record.

14. The system as claimed in claim 1, wherein said communication channels are voice communication channels.

15. The system as claimed in claim 1, including at least one field response vehicle for tracking the position of a selected transceiver unit in x, y and z coordinates, the field response vehicle having a field direction finding unit for tuning onto the reverse communication channel signal of said selected transceiver unit, the field directing finding unit having a tuner for tuning the direction finding unit to the current reverse communication channel, and the locating means further comprising means for transmitting to said field response vehicle the probable x-y coordinate location and current reverse communication channel assigned to the selected transceiver unit and any subsequent changes in communication channel assignment, whereby the direction finding unit may be tuned to the current communication channel signal of the selected transceiver unit in real time to track the x,y and z coordinate position of the selected transceiver unit.

16. The system as claimed in claim 15, wherein the tuner of the field direction finding unit comprises an automatic tuner, and the locating means further comprises means for transmitting the current communication channel and any communication channel changes in real-time to said automatic tuner, said automatic tuner comprising means for automatically tuning said field direction finder unit to each received communication channel.

17. A method of locating a transceiver unit, comprising the steps of:

providing an agile vector sensor unit at each fixed antenna site in a wireless communication network;

determining the active antenna site for a selected transceiver unit which is currently in use;

determining neighboring antenna sites within a predetermined area of the active antenna site;

activating the agile vector sensor units of the active antenna site and neighboring antenna sites to transmit information to a central monitoring station;

using the agile vector sensor unit at each of the active and neighboring antenna sites to scan the forward control and communication channels at each antenna site and determine an initial reverse communication channel and any changes in reverse communication channel for the selected transceiver unit;

tuning a scanning device of the agile vector sensor unit at the active antenna site to the initial reverse communication channel and any subsequent new communication channels;

determining azimuth and signal strength of reverse communication channel signals received from the selected transceiver unit using the agile vector sensor unit at the active antenna site;

storing the azimuth, signal strength, and current reverse communication channel of the selected transceiver unit at the agile vector sensor unit of the active antenna site;

transmitting a record comprising the azimuth, signal strength, and current reverse communication channel to the central monitoring station at predetermined intervals so that location of a selected transceiver unit may be determined continuously;

controlling the agile vector sensor units at each neighboring antenna site to tune into the current reverse communication channel of the selected transceiver unit and determine azimuth and signal strength of the reverse communication channel signal of the selected transceiver unit at each neighboring antenna site;

transmitting a record comprising the azimuth and signal strength for the current reverse communication channel at each neighboring antenna site to the central monitoring station at predetermined intervals;

re-tuning each of the agile vector sensor units to the new reverse communication channel each time a change in reverse communication channel is detected to determine and collect signal strength and azimuth information for the new reverse communication channel; and determining an approximate x and y coordinate position from the azimuth and signal strength information received from the activated agile vector sensor units.

18. The method as claimed in claim 17, including the steps of sending a field response unit to the calculated, approximate position, tuning a direction finder in the field response unit to the current reverse communication channel for the selected transceiver unit, and automatically re-tuning the direction finder to any new communication channel when the selected transceiver unit is assigned a new reverse communication channel, and using the direction finder to pinpoint the x, y and z coordinate position of the selected transceiver unit by tracking the reverse communication channel signal output of the selected transceiver unit.

19. The method as claimed in claim 17, wherein the wireless communication network is a wireless telephone network, and further including the steps of collecting and storing information on each currently connected call at each antenna site in the agile vector sensor unit at the antenna site in an idle condition of the agile vector sensor unit, and writing over the stored information with newly collected information at predetermined intervals, the information stored in the idle condition including the identification code, initially assigned reverse voice channel, and any new reverse voice channel for each call, switching the agile vector sensor unit at the active antenna site into an active mode, the agile vector sensor unit collecting azimuth and signal strength information for at least the selected transceiver unit in the active mode and transmitting at least the initial voice channel, any new voice channel changes, and azimuth and signal strength information for the selected transceiver unit to the monitoring station at periodic intervals in said active mode, and switching the agile vector sensor units at the neighboring antenna sites into active modes, the active mode at a neighboring antenna site comprising tuning to the current voice channel for the selected transceiver unit, collecting azimuth and signal strength information for the current voice channel at periodic intervals, and transmitting said collected information to the monitoring station.

20. The method as claimed in claim 19, wherein the agile vector sensor unit at the active antenna site collects signal strength and azimuth information for each connected call at periodic intervals, and transmits all collected information to the monitoring station in said active mode, and said step of determining an approximate location includes filtering said information received to exclude information relating to all calls other than said selected transceiver unit.

21. The method as claimed in claim 17, wherein the step of determining the active antenna site for a selected transceiver unit comprises transmitting the identification code for the selected transceiver unit to each of said agile vector sensor units, searching information stored at the agile vector units to detect any match to the identification code, and transmitting to the monitoring station the identification code for any agile vector sensor unit detecting a match to the identification code.

22. The method as claimed in claim 17, wherein the step of determining the active antenna site for a selected transceiver unit comprises determining an identification code for the selected transceiver unit from stored subscriber information, and obtaining trapped call trace information corresponding to that identification code from a mobile telephone switching office of the wireless communication network, the trapped information including the active antenna site, sector identification, and initially assigned voice channel for the selected transceiver unit.

23. The method as claimed in claim 22, wherein the step of determining an approximate position comprises using the received azimuth information to calculate a first probable location area, using the received signal strength information to calculate a second probable location area, comparing the first and second areas, and assigning a first predetermined confidence level to the location if the first and second areas coincide and a second, lower confidence level to the first location area if the first and second areas do not coincide.

24. The method as claimed in claim 23, including the step of using the active antenna site and sector identification to compute a third probable location area and comparing the third probable location area with the first and second location areas, and assigning a third confidence level higher than the first level to the location if all three location areas coincide.

25. The method as claimed in claim 18, including the step of assigning a time stamp to each transmitted record, the time stamp representing the actual time at which the record data was collected at the respective antenna site.

* * * * *

UNITED STATES PATENT AND TRADEMARK OFFICE
CERTIFICATE OF CORRECTION

PATENT NO. : 5,844,522

DATED : December 1, 1998

INVENTOR(S) : Eliezer A. Sheffer, et al.

It is certified that error appears in the above-indentified patent and that said Letters Patent is hereby corrected as shown below:

On the title page, item [54] and column 1, lines 1-2:

In the Title, "MOBILE TELEPHONE LOCATION SYSTEM AND METHOD" should read –NETWORK BASED LOCATION SYSTEM AND METHOD–.

In the Abstract

On line 9, after the word "phone" insert the word –or–;

In the Claims

In Claim 8, col. 23, line 46, change "voice" to –communication–;
In Claim 9, col. 23, line 52, change "voice" to –communication–;
In Claim 10, col. 23, line 60, change "voice" to –communication–;
In Claim 13, col. 24, line 8, change "voice" to –communication–;

Signed and Sealed this

Twenty-third Day of November, 1999

*Attest:*

Q. TODD DICKINSON

*Attesting Officer*        *Acting Commissioner of Patents and Trademarks*